United States Patent
Lagun et al.

(10) Patent No.: US 12,541,249 B2
(45) Date of Patent: Feb. 3, 2026

(54) IMPLICIT CALIBRATION FROM SCREEN CONTENT FOR GAZE TRACKING

(71) Applicant: Google LLC, Mountain View, CA (US)

(72) Inventors: Dmitry Lagun, Mountain View, CA (US); Gautam Prasad, Mountain View, CA (US); Pezhman Firoozfam, Mountain View, CA (US); Jimin Pi, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 226 days.

(21) Appl. No.: 18/279,117

(22) PCT Filed: Apr. 21, 2021

(86) PCT No.: PCT/US2021/028367
§ 371 (c)(1),
(2) Date: Aug. 28, 2023

(87) PCT Pub. No.: WO2022/225518
PCT Pub. Date: Oct. 27, 2022

(65) Prior Publication Data
US 2024/0126365 A1 Apr. 18, 2024

(51) Int. Cl.
*G06F 3/01* (2006.01)
*G06T 7/70* (2017.01)
*G06T 11/60* (2006.01)

(52) U.S. Cl.
CPC ............... *G06F 3/013* (2013.01); *G06T 7/70* (2017.01); *G06T 11/60* (2013.01); *G06T 2207/20081* (2013.01); *G06T 2207/20084* (2013.01)

(58) Field of Classification Search
CPC . G06F 3/013; G06T 7/70; G06T 11/60; G06T 2207/20081; G06T 2207/20084
USPC ....................................................... 382/156
See application file for complete search history.

(56) References Cited

U.S. PATENT DOCUMENTS 10,127,680 B2 11/2018 Lagun et al.
10,379,612 B1 * 8/2019 Bonnier ............... G06F 3/0304
(Continued)

FOREIGN PATENT DOCUMENTS

CN 111949131 A 11/2020
WO 2016111880 A1 7/2016

OTHER PUBLICATIONS

International Search Report and Written Opinion for Application No. PCT/US21/28367 dated Mar. 2, 2022 (21 pages).
(Continued)

*Primary Examiner* — Gabriel I Garcia
(74) *Attorney, Agent, or Firm* — Botos Churchill IP Law LLP

(57) ABSTRACT

The technology relates to methods and systems for implicit calibration for gaze tracking. This can include receiving, by a neural network module, display content that is associated with presentation on a display screen (1202). The neural network module may also receive uncalibrated gaze information, in which the uncalibrated gaze information includes an uncalibrated gaze trajectory that is associated with a viewer gaze of the display content on the display screen (1204). A selected function is applied by the neural network module to the uncalibrated gaze information and the display content to generate a user-specific gaze function (1206). The user-specific gaze function has one or more personalized parameters. And the neural network module can then apply the user-specific gaze function to the uncalibrated gaze information to generate calibrated gaze information associated with the display content on the display screen (1208). Training and testing information may alternatively be created for implicit gaze calibration (1000).

20 Claims, 32 Drawing Sheets
(19 of 32 Drawing Sheet(s) Filed in Color)

(56) References Cited

U.S. PATENT DOCUMENTS

| | | | |
|---|---|---|---|
| 10,846,877 | B2 | 11/2020 | Lagun et al. |
| 10,890,969 | B2 | 1/2021 | Yuan et al. |
| 2014/0282646 | A1* | 9/2014 | McCoy ............ H04N 21/44218 725/12 |
| 2018/0059782 | A1 | 3/2018 | San Agustin Lopez et al. |
| 2019/0018483 | A1 | 1/2019 | Aleem et al. |
| 2019/0064513 | A1* | 2/2019 | Bagherpour ....... G02B 27/0093 |
| 2019/0259174 | A1 | 8/2019 | De et al. |
| 2021/0255485 | A1* | 8/2021 | Xu .......................... G06F 3/011 |

OTHER PUBLICATIONS

Partial Search Report and Provisional Opinion for Application No. PCT/US21/28367 dated Jan. 31, 2022.

"Gaze Interaction Library", Gaze Interaction Library—Windows Community Toolkit | Microsoft Docs, https://docs.microsoft.com/en-us/windows/communitytoolkit/gaze/gazeinteractionlibrary, Jan. 22, 2021, pp. 1-10.

"Tracking and Visualizing Faces", Tracking and Visualizing Faces | Apple Developer Documentation, https://developer.apple.com/documentation/arkit/tracking_and_visualizing_faces#see-also, Jan. 22, 2021, pp. 1-6.

Montabone, Sebastian, et al., "Human Detection Using a Mobile Platform and Novel Features Derived From a Visual Saliency Mechanism", Preprint submitted to Image and Vision Computing, Jan. 9, 2009, 28 pgs.

Park, Seonwook, et al., "Towards End-to-end Video-based Eye-Tracking", arXiv:2007.13120v1 [cs.CV] Jul. 26, 2020, 27 pgs.

\* cited by examiner

310

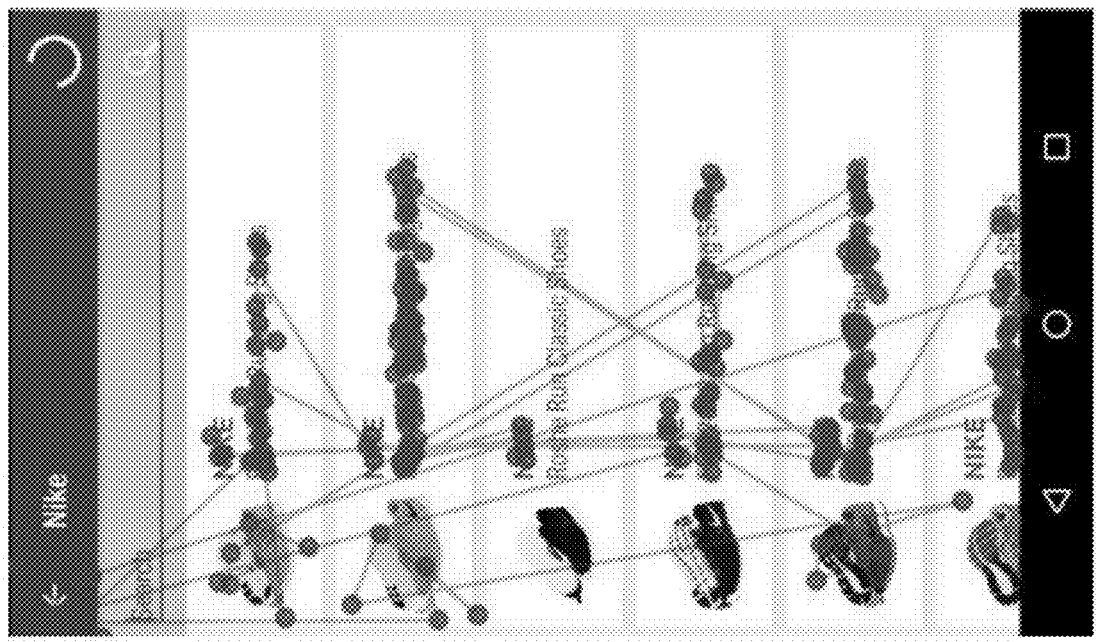
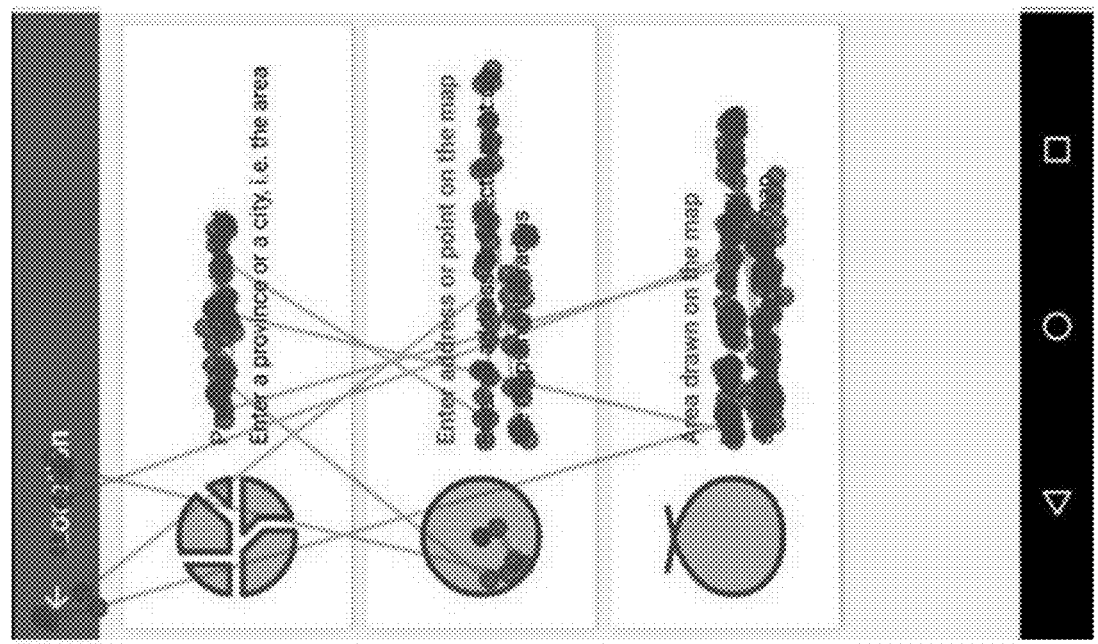
Fig. 4C

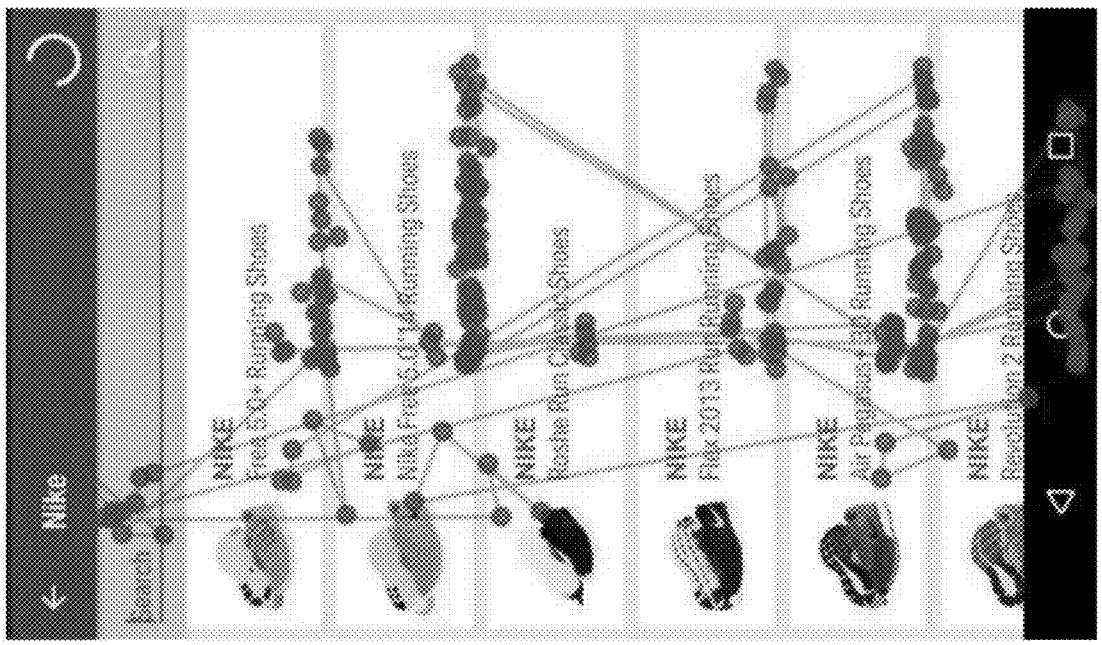
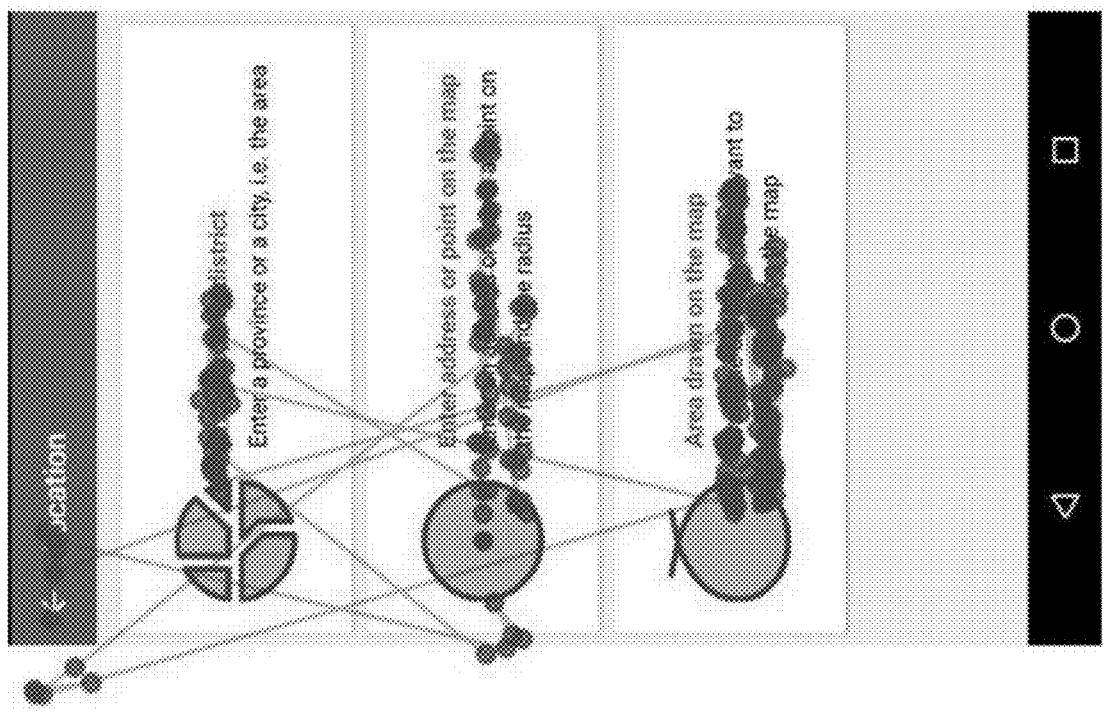
Fig. 4D

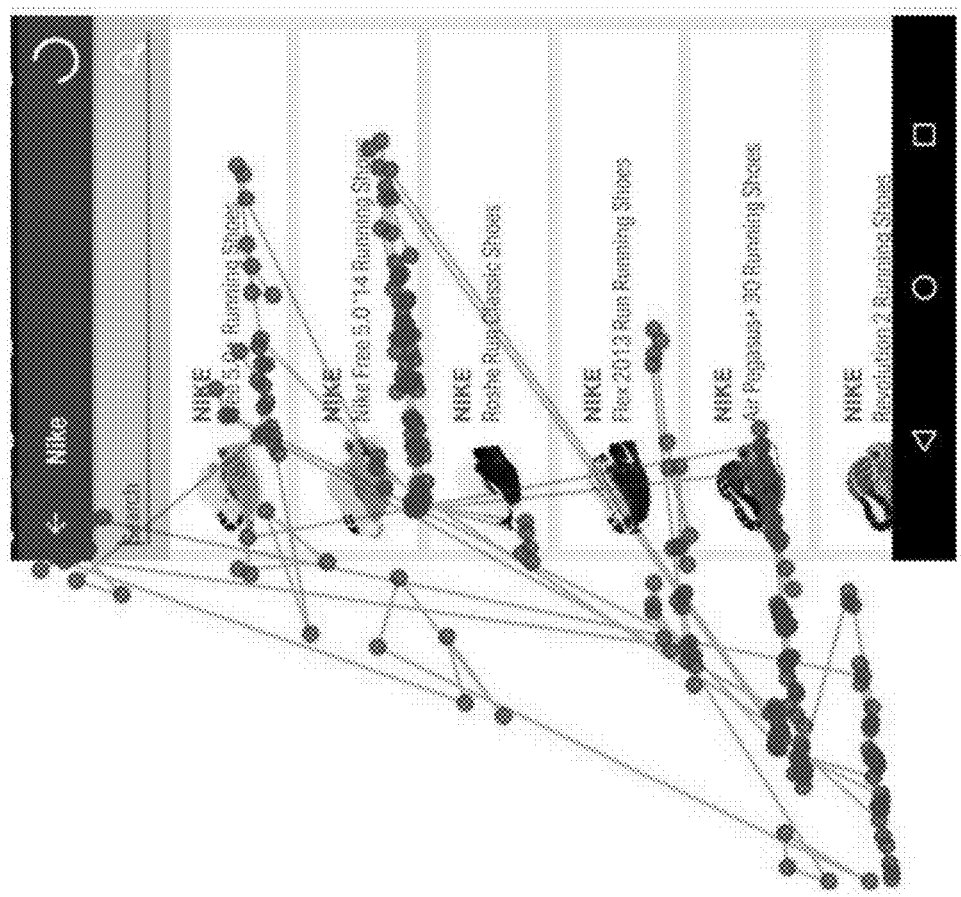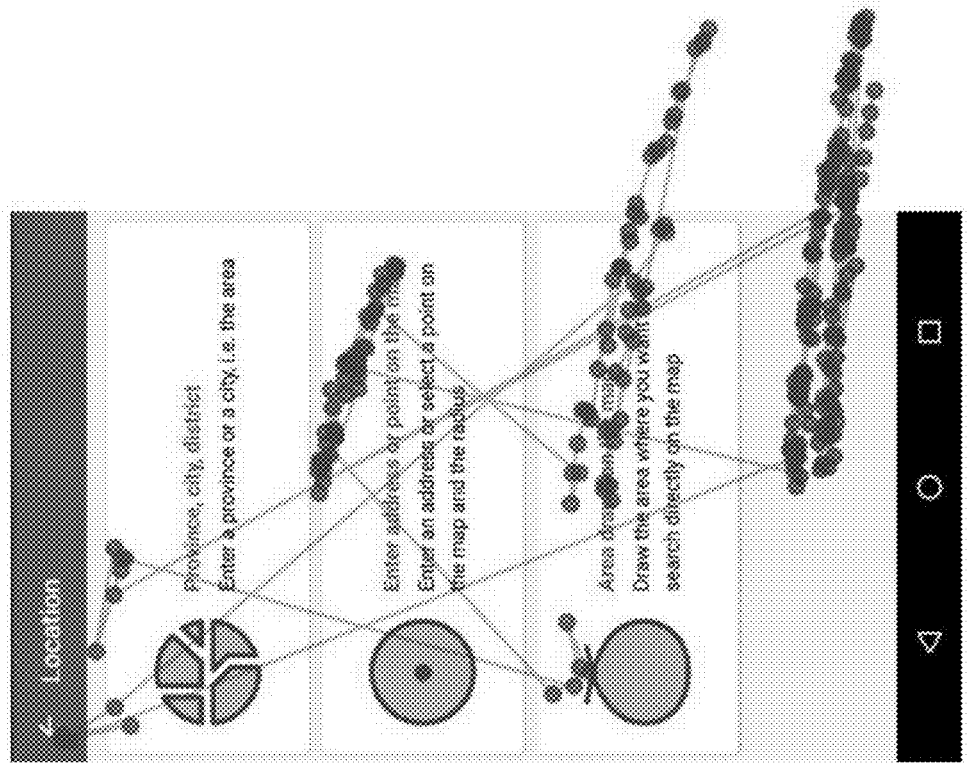
Fig. 4E

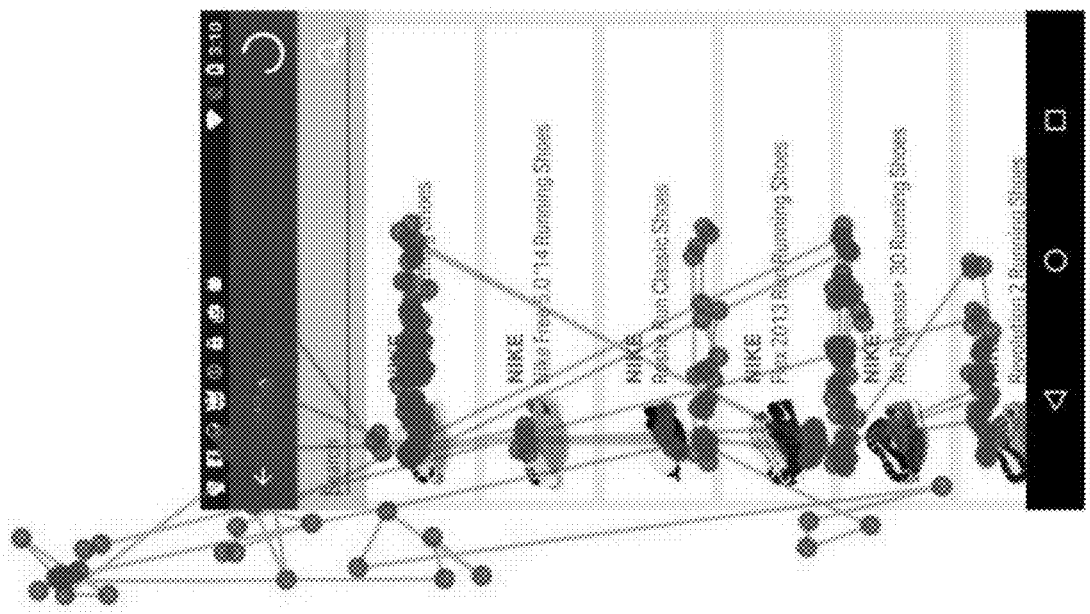
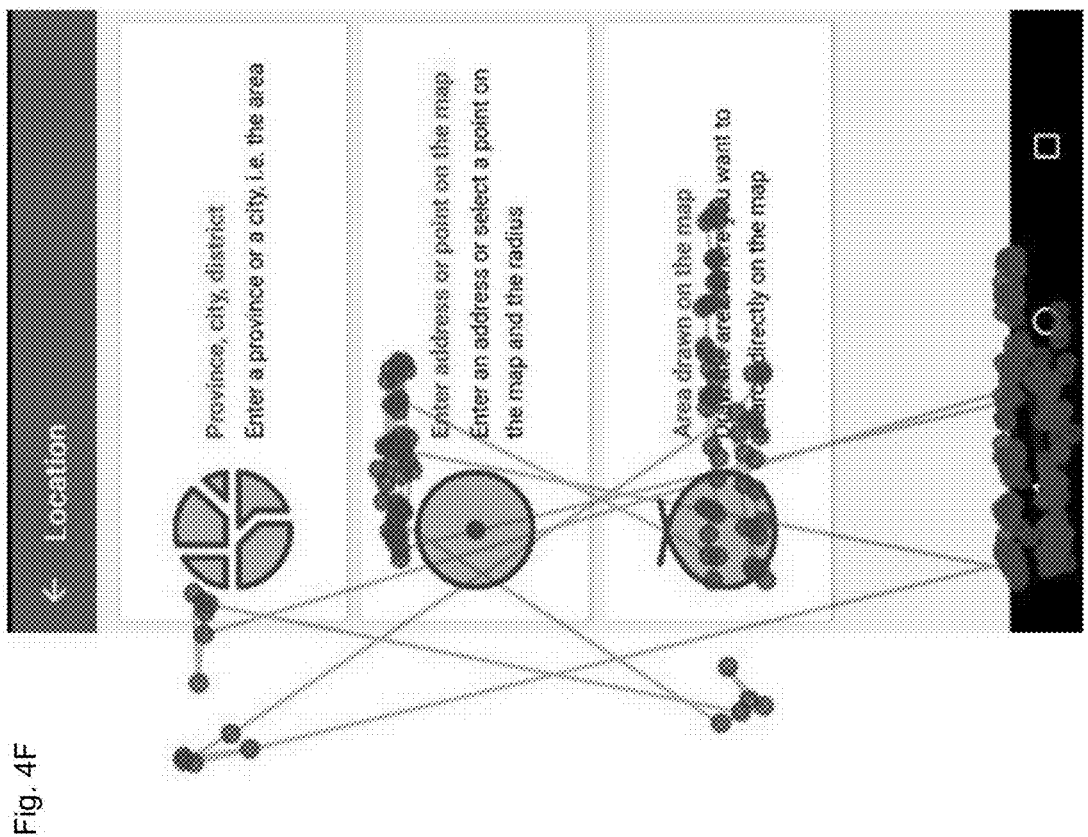
Fig. 4F

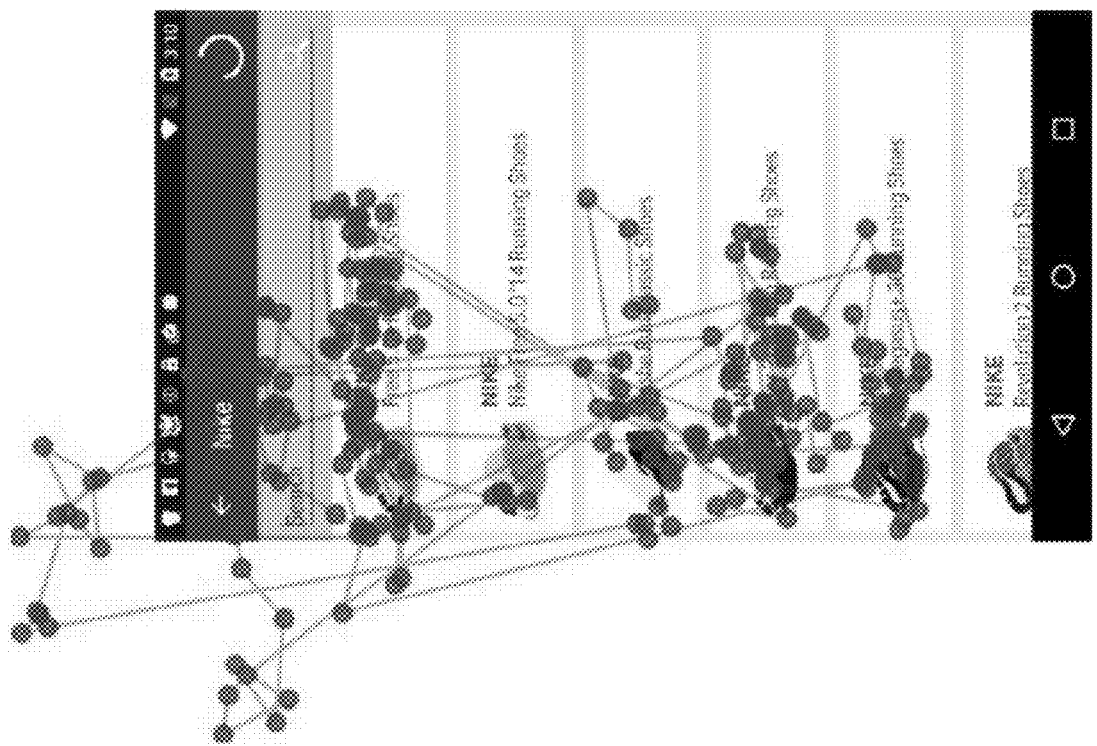
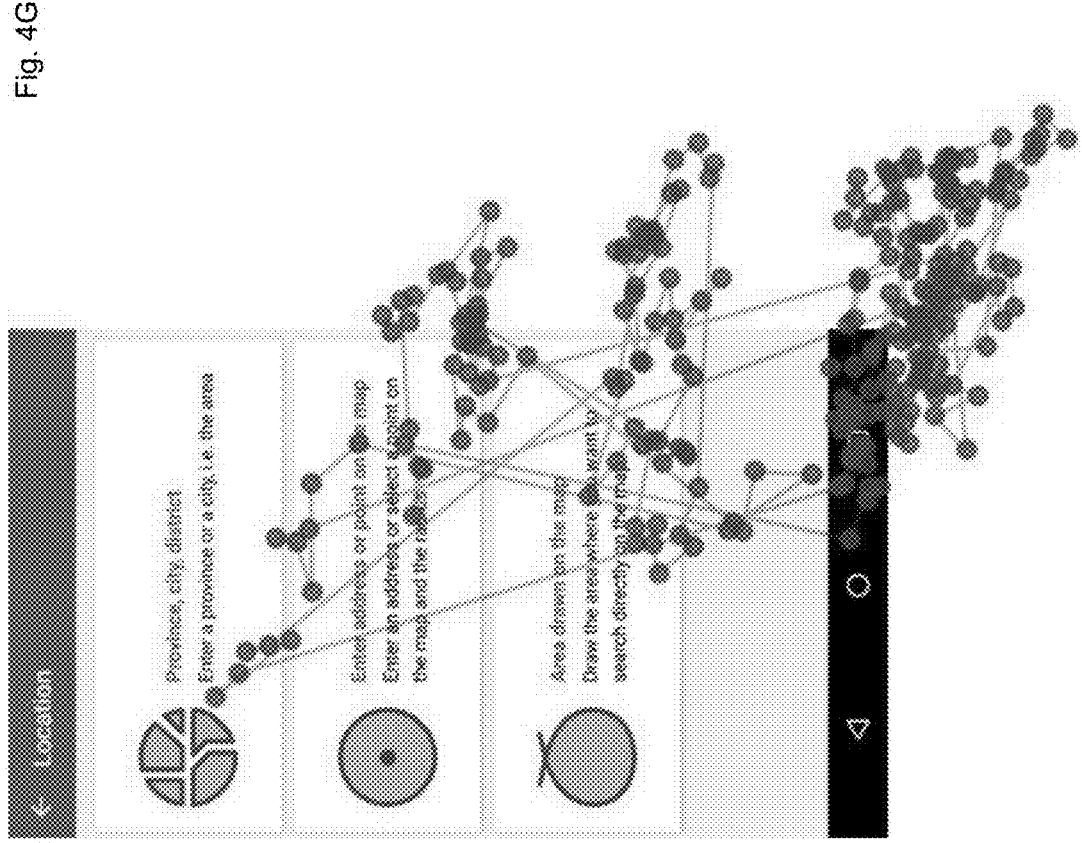
Fig. 4G

500

620
Synthetic Screen Content With Gaze Trajectory

610
One Synthetic Gaze Trajectory

600
Synthetic Screen Content

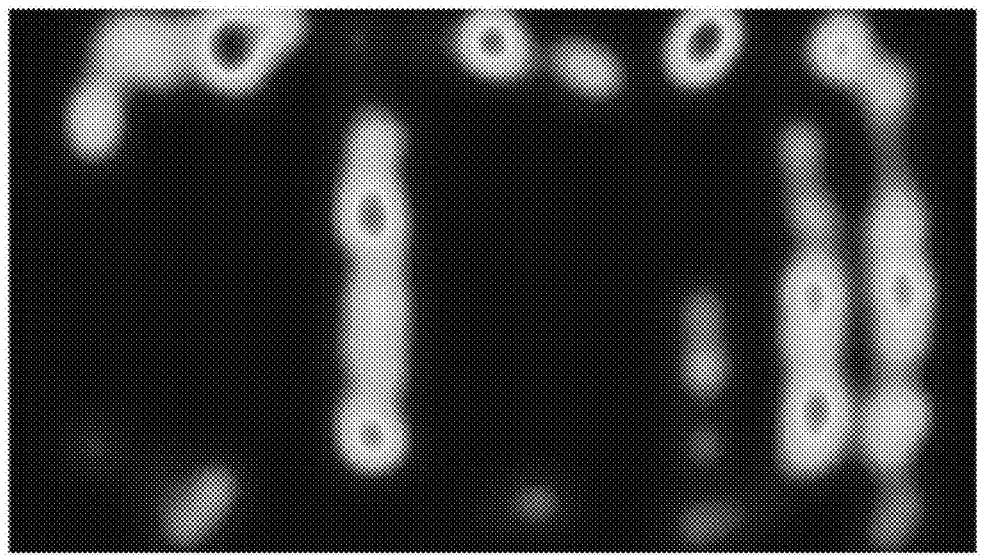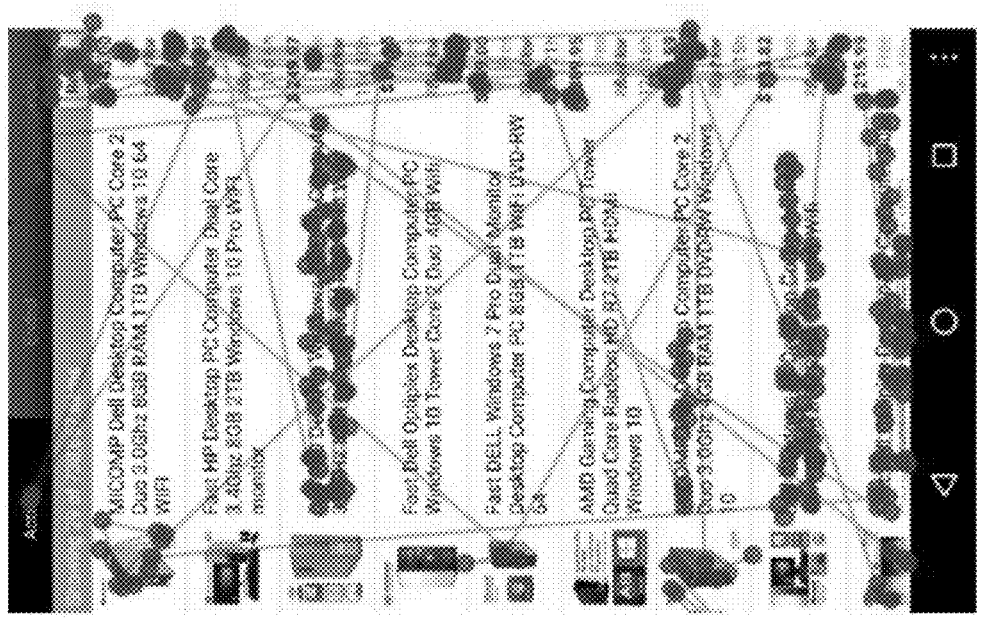
Fig. 6D

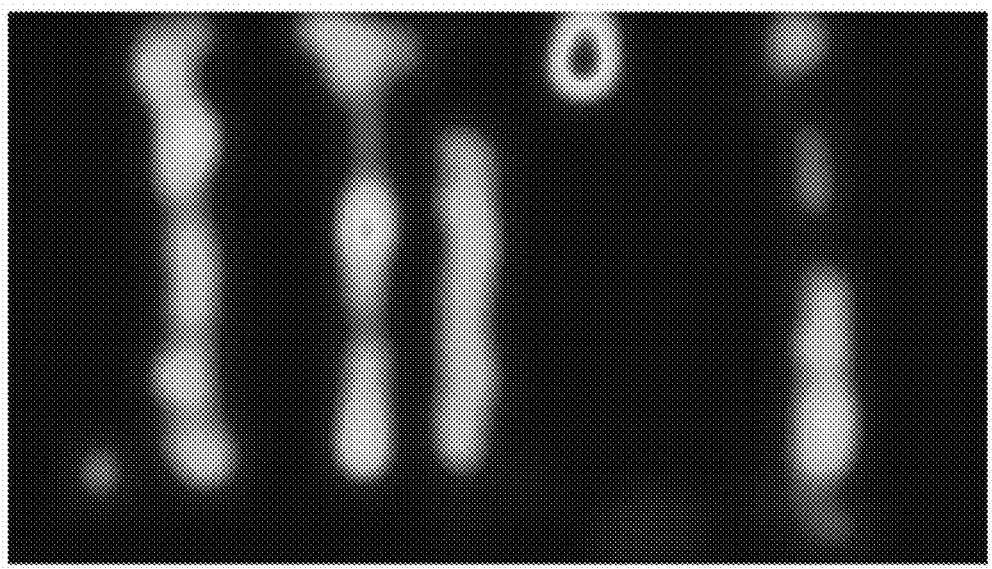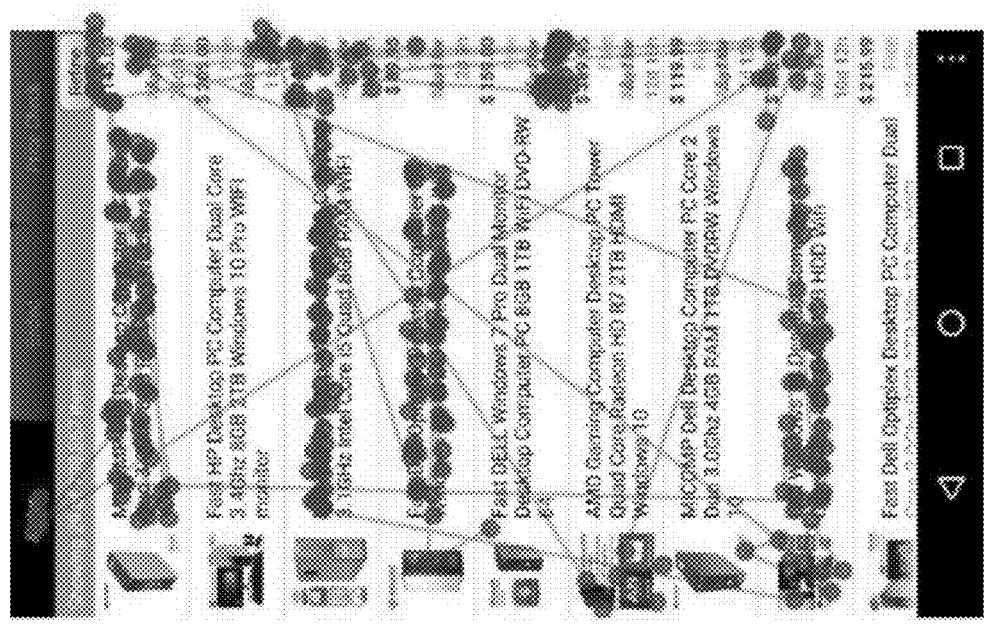
Fig. 6E

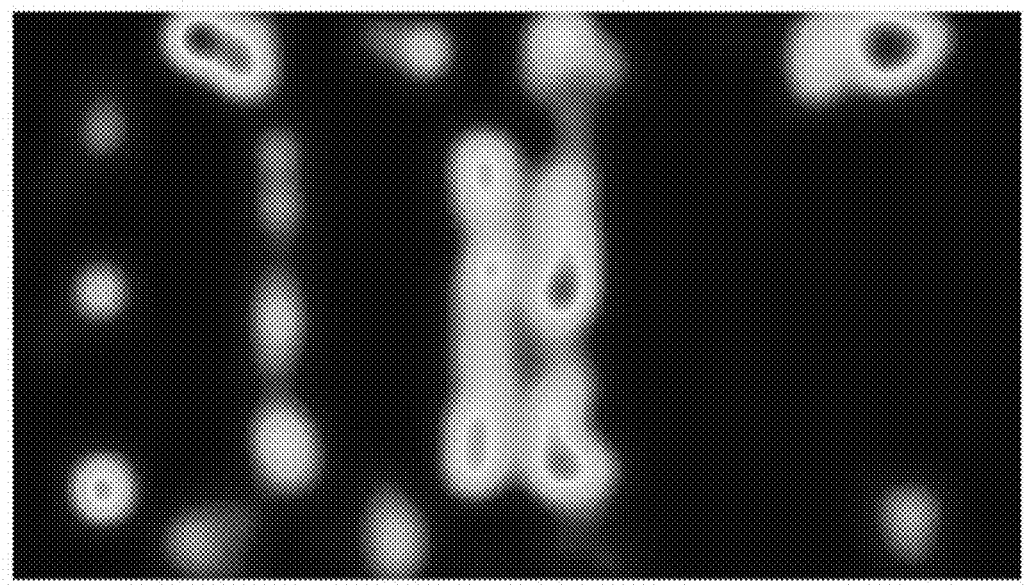
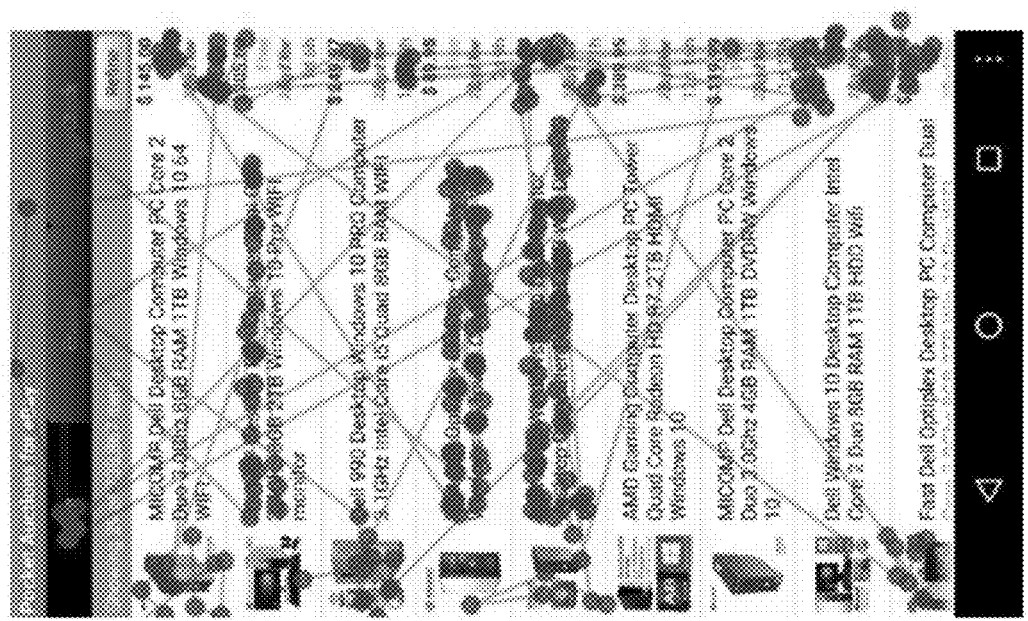
Fig. 6F

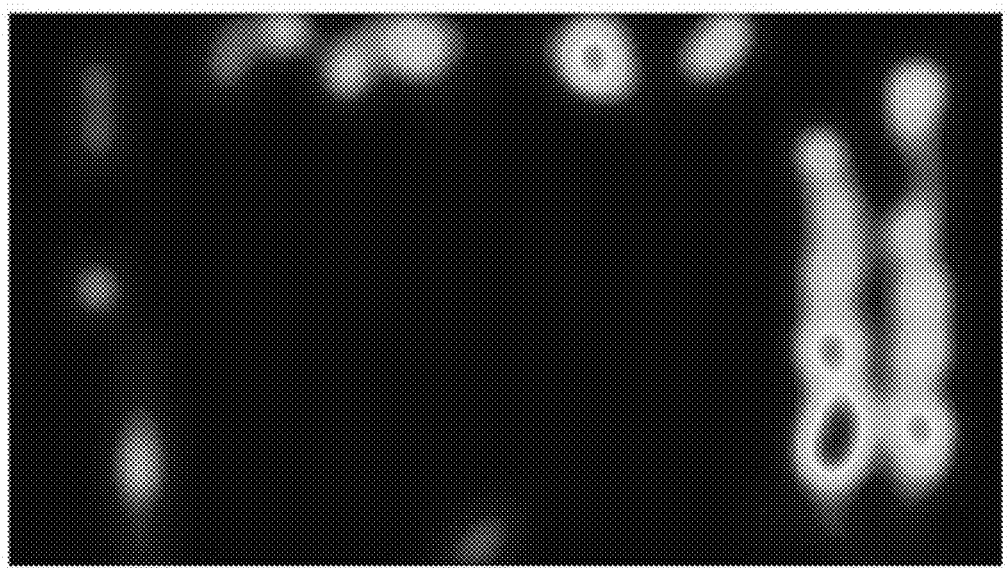
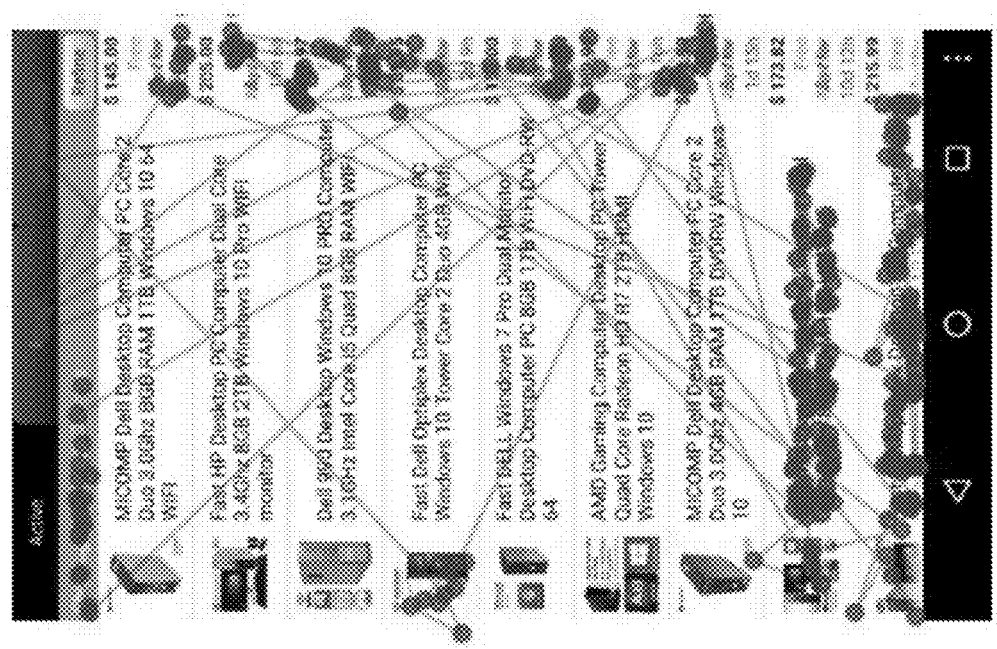
Fig. 6G

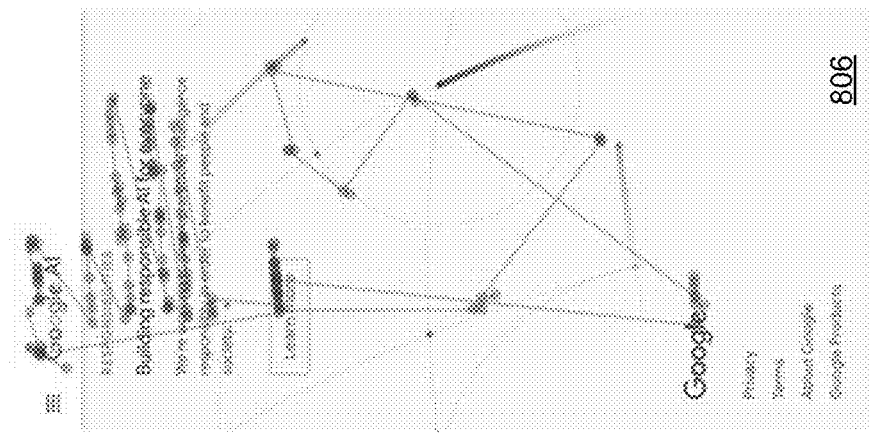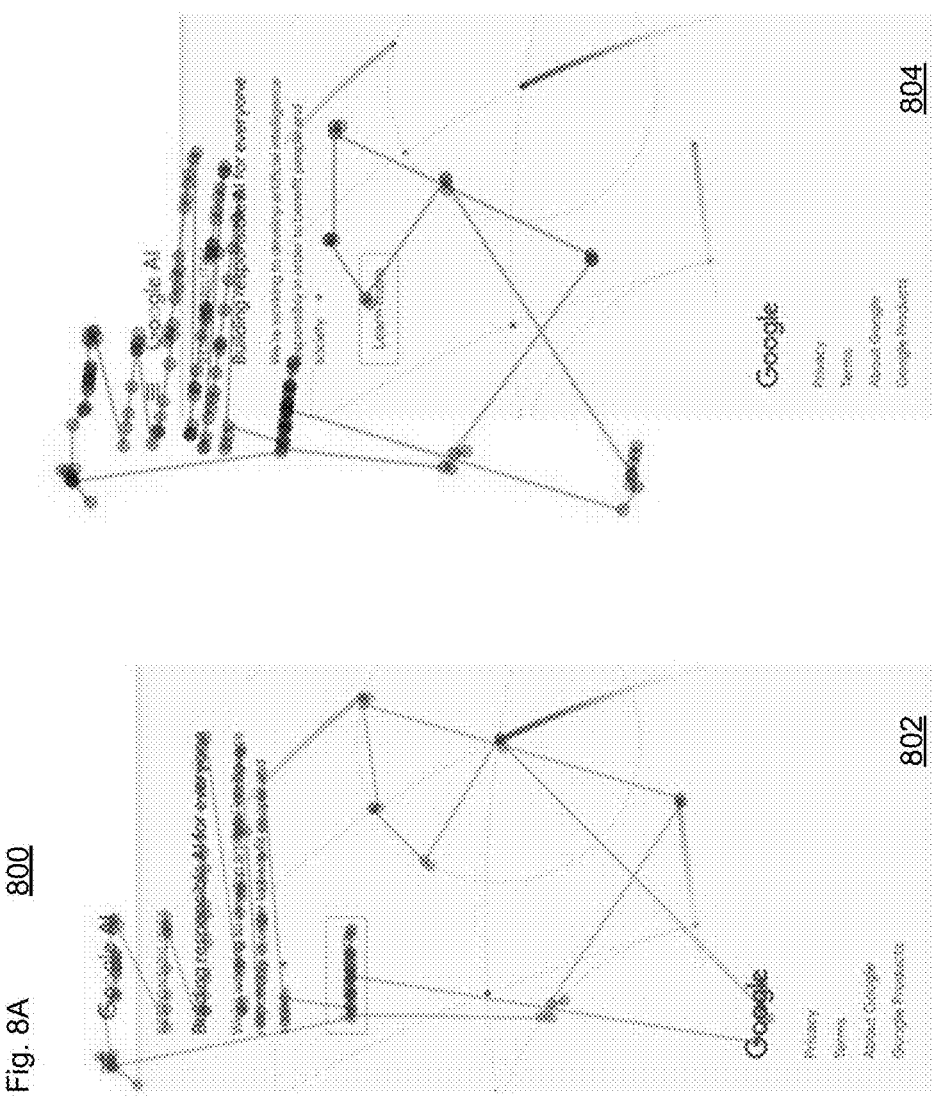
Fig. 8A

820

810

920

1020

1100

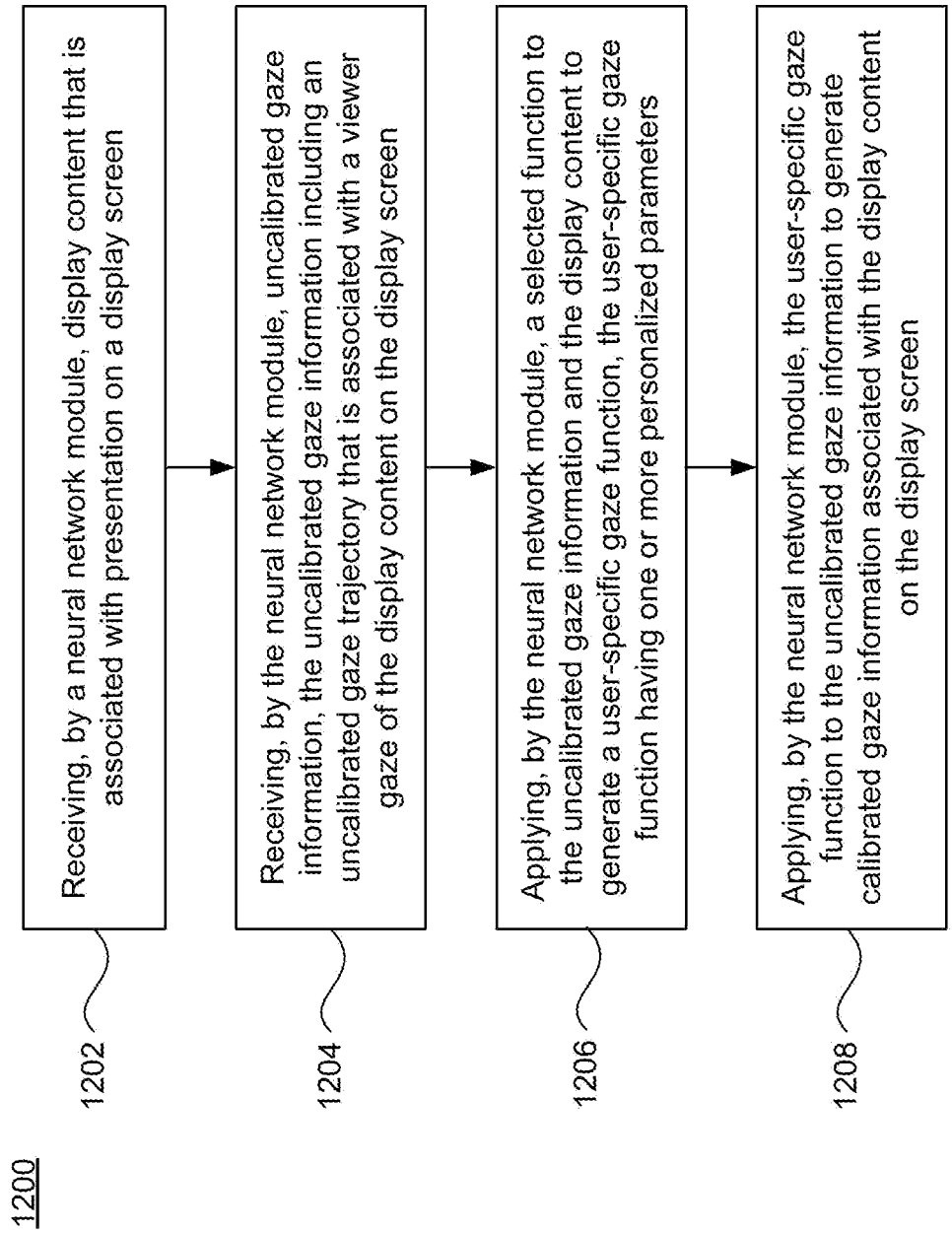

IMPLICIT CALIBRATION FROM SCREEN CONTENT FOR GAZE TRACKING

CROSS-REFERENCE TO RELATED APPLICATIONS

The present application is a national phase entry under 35 U.S.C. § 371 of International Application No. PCT/US21/28367, filed Apr. 21, 2021, published in English, the entire disclosure of which is incorporated herein by reference.

BACKGROUND

Gaze tracking can be used to determine what a user is currently looking at on a display screen of his or her device. This information may be used as part of an interactive user interface, for instance to select content that is presented on the display screen. However, what the user is actually looking at may not be what a gaze tracking system determines the user is looking at. Uncalibrated systems may use device-specific information to aid in gaze tracking. In the past, gaze prediction systems have used an explicit approach to calibrate for a particular individual. Such personalized training with a research-grade eye tracker may be time and resource intensive, involving multiple training scenarios evaluated for the particular individual. These approaches may not be beneficial or optimal, for instance depending on the type of device and user constraints.

BRIEF SUMMARY

The technology relates to methods and systems for implicit calibration for gaze tracking. In other words, the calibration of the gaze tracking is performed without presenting an explicit calibration step to a user. Spatiotemporal information (screen content) is presented on a display screen, for instance passively according to a model that tracks the eye in the spatial domain. An end-to-end model employs a saliency map (heat map) for points of interest on the screen. Content being displayed (e.g., screen shots or any other suitable representation of the content being displayed on the display screen) and uncalibrated gaze information are applied to the model to obtain a personalized function. This may involve evaluating the entire gaze trajectory for a given screen shot, e.g., using a neural network. By way of example, real web pages or synthetic content or data may be utilized. The neural network may encode temporal information associated with displayed content and an uncalibrated gaze at a particular time, creating a context vector, and decoding to output a corrected gaze function. This output personalized function can then be applied to calibrate the gaze and identify what the user was actually looking at on the display screen. The approach described herein may provide a faster approach calibration for gaze tracking which is less resource intensive and can be implemented on individual user devices. Improved calibration may therefore be provided.

Identifying what a user is actually looking at via the implicit calibration approach has various benefits and can be used in all manner of applications. For instance, the approach does not require multiple training sessions for a given user, and can be done in real time with a wide variety of display devices. By way of example, users may operate a user interface or navigate a wheelchair with their gaze as the primary or only control signal. Calibration of gaze tracking may therefore be improved by the approach described herein. In other situations, implicit calibration can be used as part of a multi-modal interaction to improve the user experience, such as in combination with voice, touch and/or hand gestures. Still other situations may include virtual reality (VR) environments including interactive gaming (e.g., with a game console or handheld gaming device), concussion diagnosis or other medical screenings using different types of medical equipment, and monitoring driver (in) attention in a manual or partly autonomous driving mode of a vehicle such as a passenger car, a bus or a cargo truck.

According to one aspect, computer-implemented method of performing implicit gaze calibration for gaze tracking is provided. The method comprises receiving, by a neural network module, display content that is associated with presentation on a display screen; receiving, by the neural network module, uncalibrated gaze information, the uncalibrated gaze information including an uncalibrated gaze trajectory that is associated with a viewer gaze of the display content on the display screen; applying, by the neural network module, a selected function to the uncalibrated gaze information and the display content to generate a user-specific gaze function, the user-specific gaze function having one or more personalized parameters; and applying, by the neural network module, the user-specific gaze function to the uncalibrated gaze information to generate calibrated gaze information associated with the display content on the display screen.

The selected function may be a linear or polynomial function. The uncalibrated gaze information may further include timestamp information for when the display content was collected. The uncalibrated gaze information may further include at least one of screen orientation information, camera focal length, aspect ratio, or resolution information. The one or more personalized parameters of the user-specific gaze function may be estimated from collected data.

Applying the selected function to the uncalibrated gaze information and the display content to generate a user-specific gaze function may include generating temporal information and dimensional information at an encoder block of the neural network; generating a context vector from the temporal information and the dimensional information in a self-attention block of the neural network; and applying the context vector to the uncalibrated gaze information to generate the calibrated gaze information, in a decoder block of the neural network. The temporal information may encompass a selected time interval associated with a gaze along the display screen. Here, the temporal information may be encoded by looking through an entire sequence of gaze measurements and screen content pixels associated with the entire sequence. Applying the context vector to the uncalibrated gaze information may comprise multiplying the context vector with an array of data from the uncalibrated gaze information. Alternatively or additionally, applying the context vector to the uncalibrated gaze information may include applying the uncalibrated gaze information and the context vector using a plurality of fully connected layers of the neural network.

The display content may comprise synthetic content. The synthetic content may include at least one of synthetic text or synthetic graphical information. Alternatively or additionally, the synthetic content may correspond to a dataset of gaze trajectories for a group of users over a selected number of unique user interfaces.

According to another aspect, a system comprising one or more processors and one or more storage devices storing instructions is provided, wherein when the instructions are executed by the one or more processors. The one or more processors implement a method of implicit gaze calibration for gaze tracking comprising receiving, by a neural network module of the one or more processors, display content that is associated with presentation on a display screen; receiving, by the neural network module, uncalibrated gaze information, the uncalibrated gaze information including an uncalibrated gaze trajectory that is associated with a viewer gaze of the display content on the display screen; applying, by the neural network module, a selected function to the uncalibrated gaze information and the display content to generate a user-specific gaze function, the user-specific gaze function having one or more personalized parameters; and applying, by the neural network module, the user-specific gaze function to the uncalibrated gaze information to generate calibrated gaze information associated with the display content on the display screen.

According to a further aspect of the technology, a computer-implemented method of creating training and testing information for implicit gaze calibration is provided. The method comprises obtaining, from memory, a set of display content and calibrated gaze information, the display content including a timestamp and display data, and the calibrated gaze information including a ground truth gaze trajectory that is associated with a viewer gaze of the display content on a display screen; applying a random seed and the display content and calibrated gaze information to a transform; and generating, by the transform, a set of training pages and a separate set of test pages, the sets of training pages and test pages each including screen data and uncalibrated gaze information.

The set of training pages may further include the calibrated gaze information. The calibrated gaze information may comprise a set of timestamps, a gaze vector, and eye position information.

According to the method, in one scenario the transform is a $\Phi(\gamma)$ transform, in which $\gamma$ represents one or more user-level parameters and $\Phi$ represents one or more functional forms that operationalize the one or more user-level parameters $\gamma$. In this case, a single person will share the same $\Phi$ and same $\gamma$ parameters for different page viewing. In an example, one or both of $\Phi$ and $\gamma$ are variable to generate perturbed sets of training pages and test pages. The perturbed sets of training and test pages may be formed by either varying a specific magnitude and direction of a translation of the calibrated gaze information or a specific rotation amount of the calibrated gaze information.

The sets of training pages and test pages may be non-overlapping subsets from a common set of pages.

In another example, the method further comprises applying the set of training pages to a calibration model, in which displayable screen information, the uncalibrated gaze information and the calibrated gaze information are inputs to the calibration model, and a corrected gaze function is output from the calibration model.

In yet another example, the method further comprises applying the set of test pages to the corrected gaze function to generate a corrected gaze trajectory; and evaluating the corrected gaze trajectory against the ground truth gaze trajectory.

And according to another aspect of the technology, a computer program product comprising one or more instructions which, when executed, cause one or more processors to perform any of the methods described above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 4C-G illustrate examples of uncalibrated gaze trajectories generated through different error models, in accordance with aspects of the technology.

FIGS. 6D-G illustrate examples of synthetic users viewing a same mobile user interface in accordance with aspects of the technology.

FIGS. 8A-C illustrate examples of ground truth, uncalibrated and corrected gaze information in accordance with aspects of the technology.

FIG. 12 illustrates a method in accordance with aspects of the technology.

DETAILED DESCRIPTION

Overview

The technology employs implicit calibration based on content being displayed and uncalibrated gaze information to obtain a personalized function. A saliency map (heat map) is obtained for points of interest on the screen that may relate to actual display content or synthetic display content/data, which can include text and/or other graphical information (e.g., photographs, maps, line drawings, icons, etc.). The personalized function can then be applied to the saliency map to produce corrected gaze information.

Figure 1:
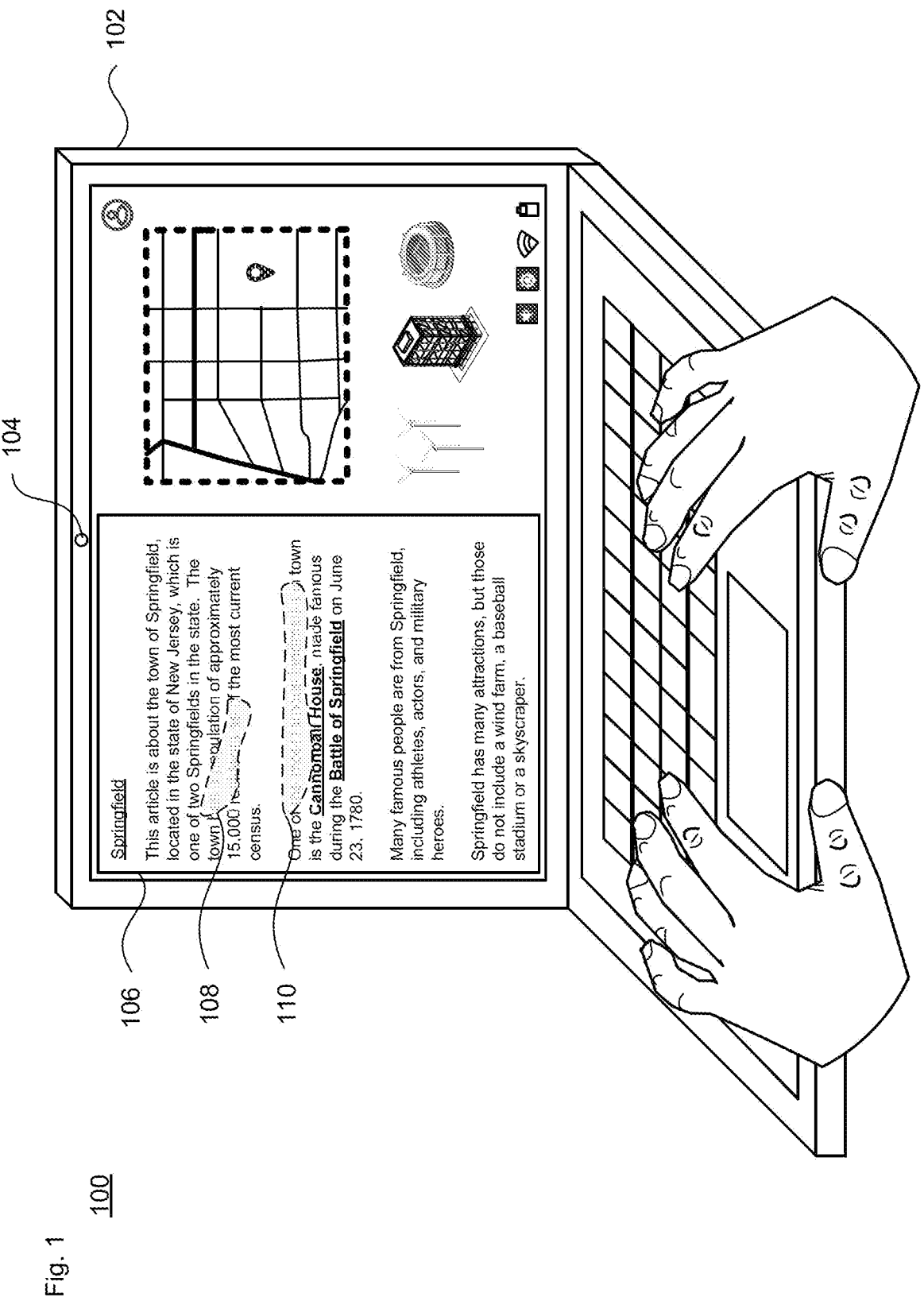
FIG. 1 illustrates an example gaze tracking situation in accordance with aspects of the technology.

FIG. 1 illustrates an example scenario 100. In this example, a user may be positioned in front of a computing device such as a laptop 102. While laptop 102 is shown, the computing device may be another client device such as a desktop computer, tablet PC, smartwatch or other wearable computing device, etc. Alternatively, the computing device may be a home-related device such as a smart home assistant, smart thermostat, smart doorbell, etc. These examples are not limiting, and the technology may be used with other personal computing devices, in-home appliances, autonomous vehicles or the like.

As shown, the laptop 102 includes a front-facing camera 104. While only one camera is shown, multiple cameras may be employed at different locations along the laptop, for instance to provide enhanced spatial information about the user's gaze. Alternatively or additionally, other sensors may be used, including radar or other technologies for sensing gestures, as well as near infrared and/or acoustic sensors. At least one display screen 106 is configured to provide content to the user (or users). The content may be actual content such as information from a website, graphics from an interactive game, graphical information from an app, etc. The content may also be synthetic data that may comprise text and/or graphical information used to train a model.

The camera 104 may detect the user's gaze as the user looks at various content on display screen 106. In this example, the system may identify an uncalibrated gaze detection region 108 associated with a first portion of the displayed content. However, the user may actually be looking at region 110 associated with a second portion of the displayed content. The first and second portions of the content may be distinct as shown, or may overlap. Implicit calibration as discussed herein is used to identify the correct viewing area(s) such as region 110.

Figure 2:
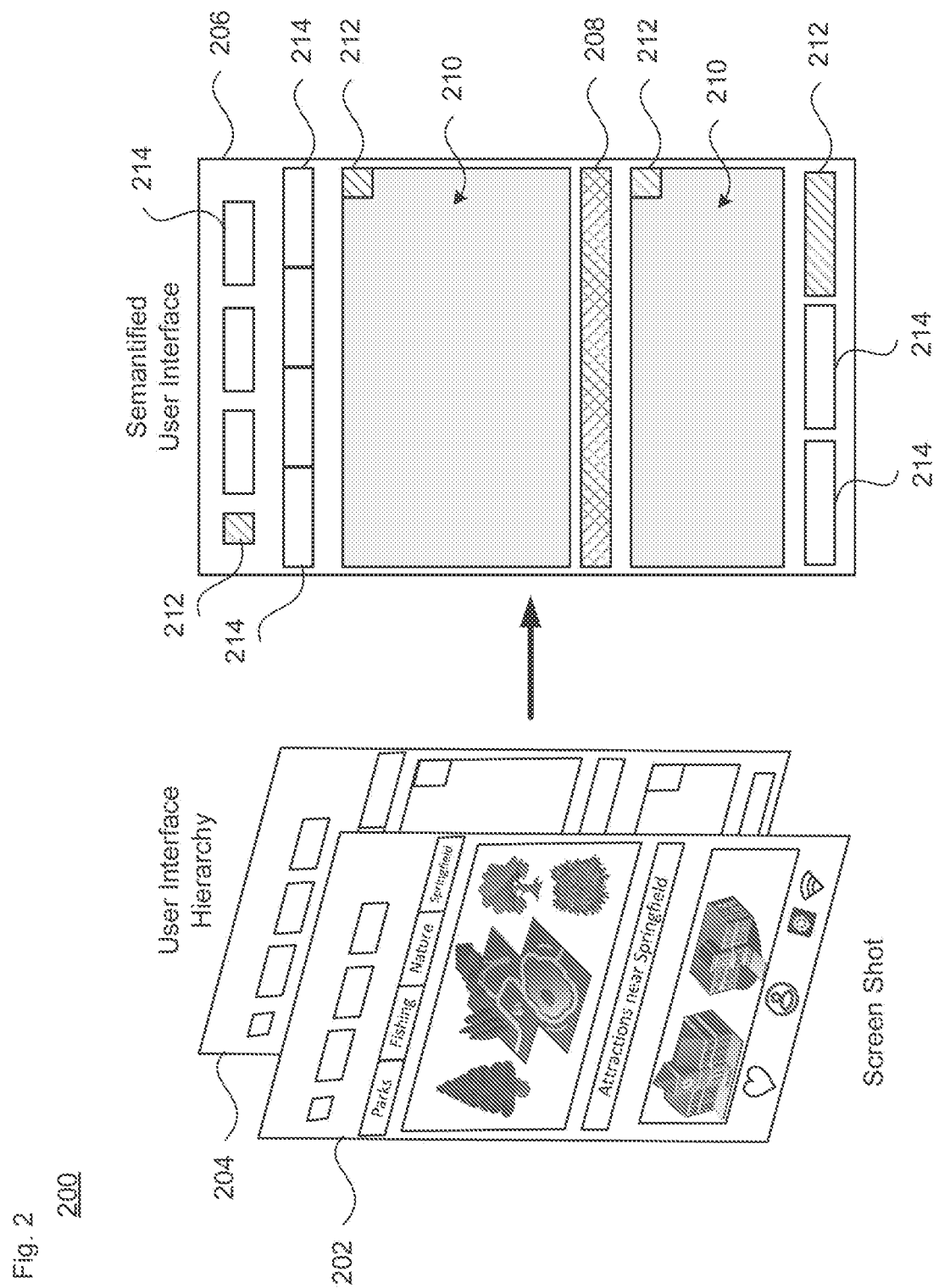
FIG. 2 illustrates a semantified user interface in accordance with aspects of the technology.

FIG. 2 illustrates an example 200 showing how displayed content, shown as a screen shot 202 relates to a user interface hierarchy 204, for instance as may occur on a website or other structured form. As shown in this example, the screen shot includes imagery (e.g., parks and attractions associated with a location of interest), textual information and other information including links to other web pages. The information from the user interface hierarchy and the screen shot may correlate to a "semantified" user interface 206 that includes areas of text 208, images 210, icons 212, and/or tabs or other navigation elements 214.

General Implicit Gaze Calibration Approach

Figure 3A:
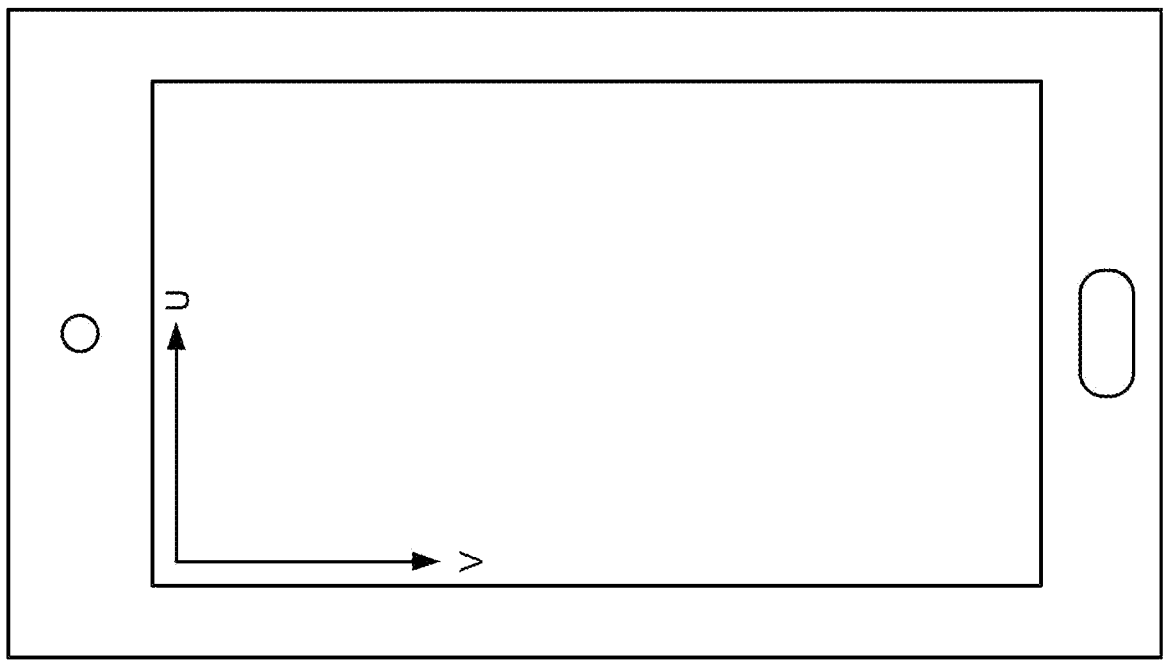
FIGS. 3A-B illustrate 2D and 3D user-specific parameters in accordance with aspects of the technology.
Figure 3B:
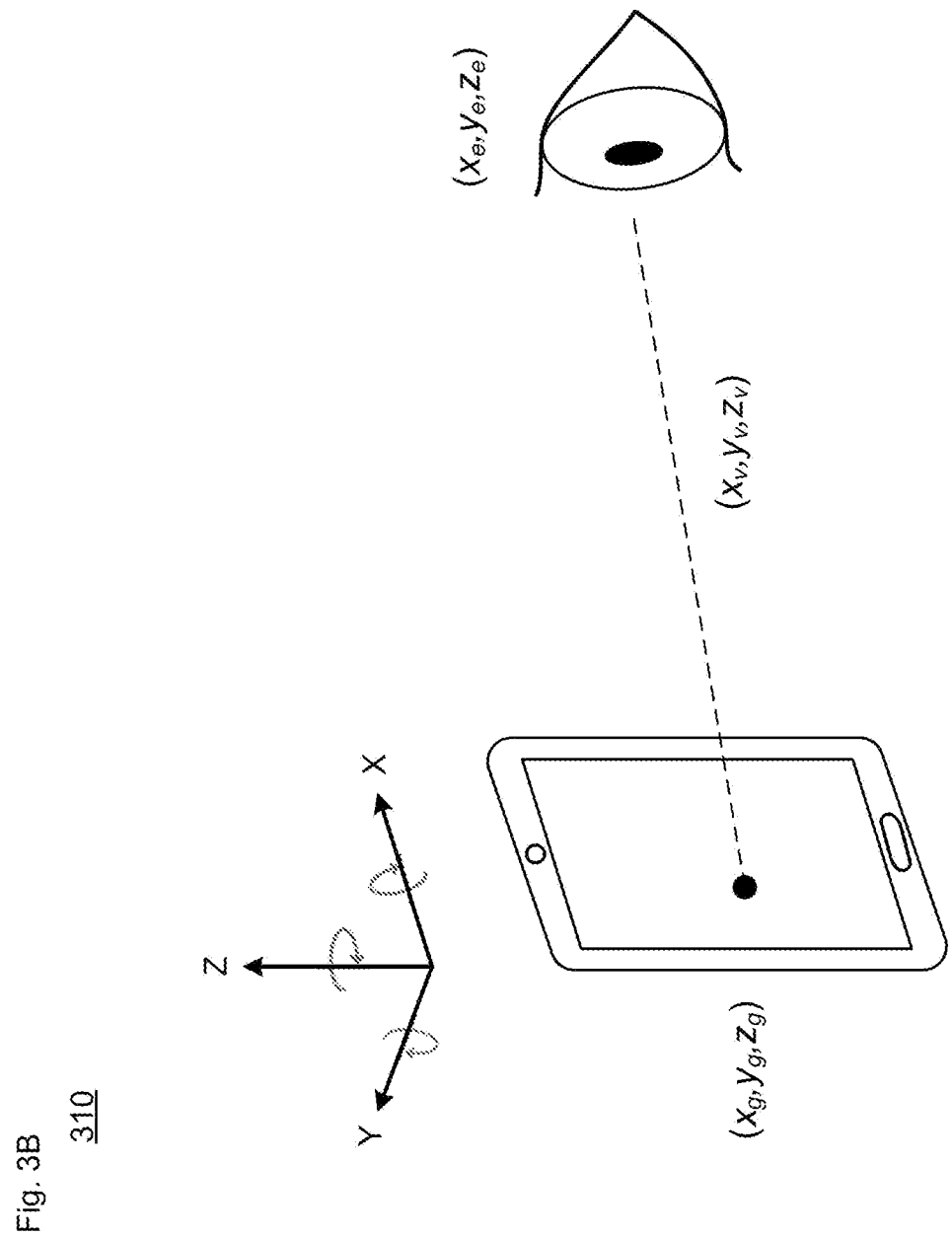

The semantified user interface 206 is used during implicit gaze calibration, as is discussed in detail below. This approach can be particularly beneficial because a difference between the eye's visual axis and its optical axis (the Kappa angle) can result in misidentification of the user's gaze. FIGS. 3A and 3B illustrate coordinate system examples for displaying content on the display screen (example 300 of FIG. 3A), and the gaze direction and eye position in 3D space (example 310 of FIG. 3B). According to one aspect of the technology, for each trial, example or evaluation, there is information associated with the 2D screen coordinate system (U,V directions on the display screen in example 300), as well as information associated with the 3D world view based on the user's eye position and gaze direction. By way of example only, for each trial, the system may provide a user identifier, a trial identifier, true gaze trajectories and uncalibrated gaze trajectories in the (U,V) screen coordinate system. Eye position $(x_e, y_e, z_e)$ and gaze direction $(x_v, y_v, z_v)$ may be provided in the world coordinate system, with the gaze position on the screen being $(x_g, y_g, z_g)$.

In one scenario, the screen size may be on the order 75 mm (U direction) by 160 mm (V direction), with a resolution of 540 pixels (U direction) by 960 pixels (V direction). The gaze information may be captured multiple times per second, such as 10-20 times per second. In an example, the gaze refresh rate is on the order of 10-30 Hz, and there may be multiple timestamps associated with a given page, such as 100-400 timestamps per page.

Figure 4A:
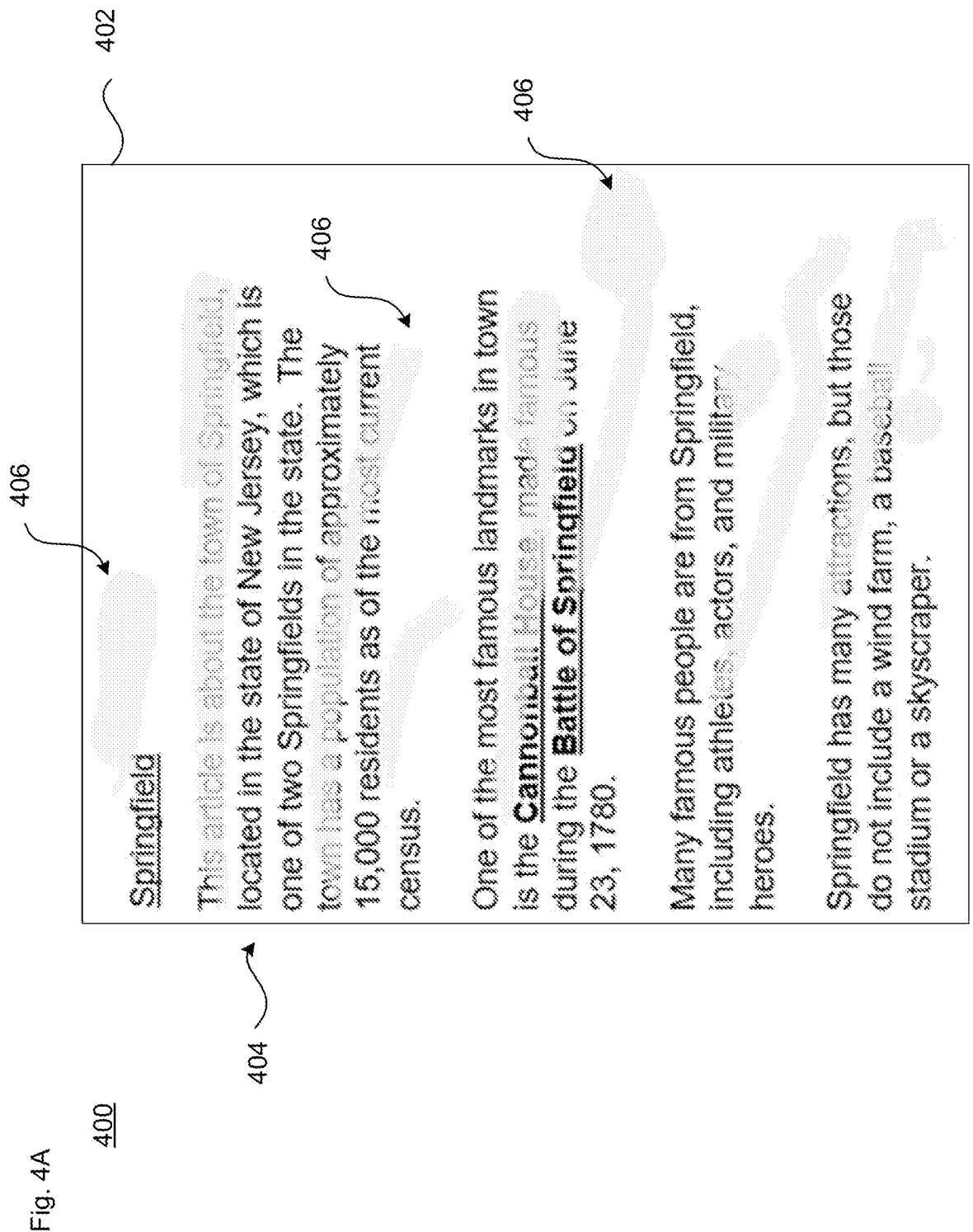
FIGS. 4A-B illustrate screen content and calibration of gaze in accordance with aspects of the technology.
Figure 4B:
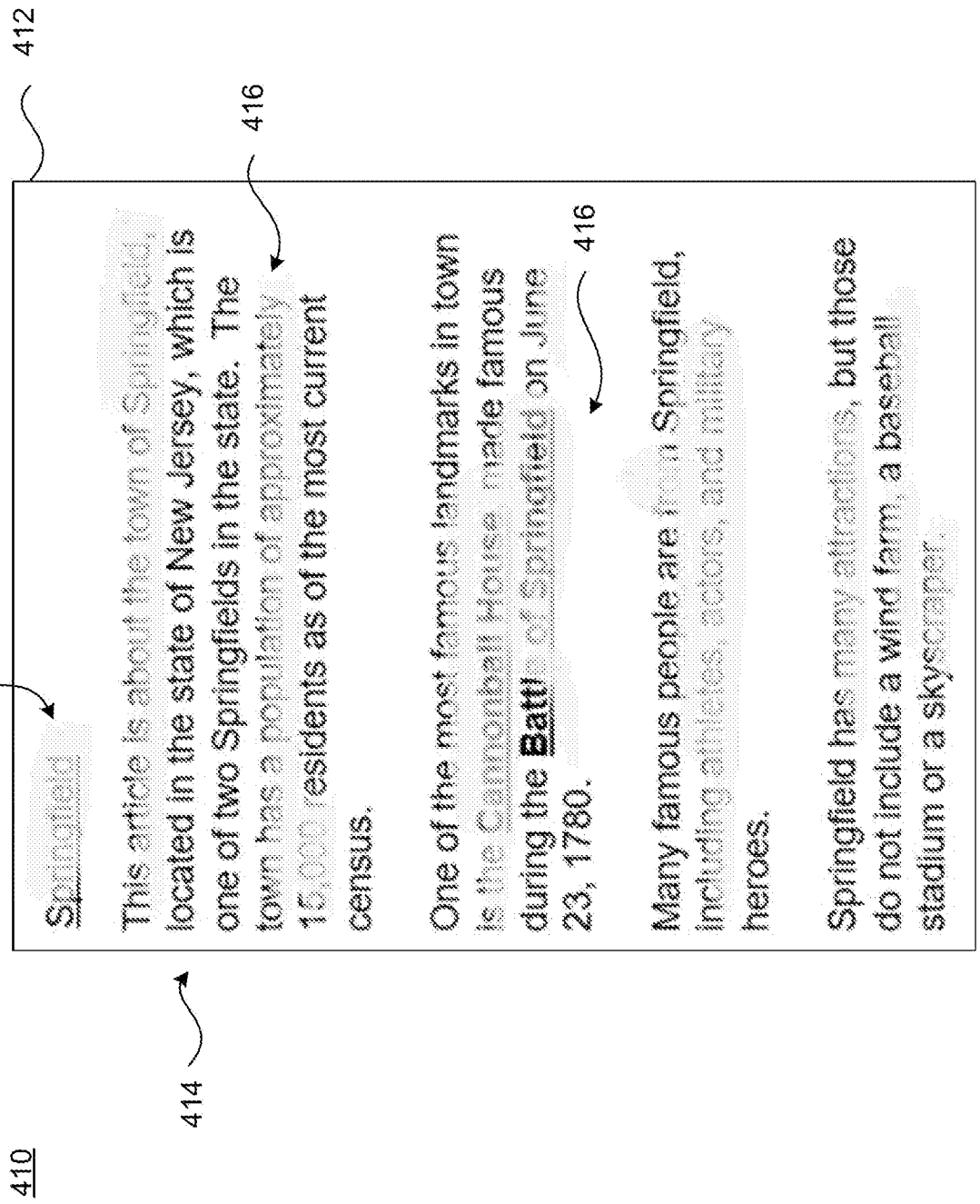

FIG. 4A illustrates an example 400 of screen content and the uncalibrated gaze of a user, while FIG. 4B illustrates a correction 410 for the gaze. In particular, FIG. 4A shows a screenshot of a screen 402 having textual content 404. Highlighted regions 406 illustrate the observed uncorrected gaze of the user viewing the textual content 404 at a particular point in time. It provides a predictive distribution of the gaze point over the screen area. The point in time may be about a second or more or less (e.g., 0.2-0.5 seconds, 2-10 seconds, etc.). In one scenario, the gaze refresh rate may be between 10-30 Hz, such as 20 Hz. As can be seen in this view, the highlighted regions 406 do not necessarily correspond to particular lines or segments of the text, even though the highlighted regions may overlap with parts of the textual content 404. After implementing implicit gaze calibration, the calibrated gaze of the user may be as shown in FIG. 4B. Here, an updated screen 412 includes the same textual content 414 as the content 404 of FIG. 4A. The saliency/heat map of areas of interest does not directly correspond to the spatial location of the highlighted regions shown on the display screen in FIG. 4A. However, highlighted areas 416 now align with particular lines or segments of the text, which associate with what the user's gaze was looking at.

When using a gaze tracking system without calibration, the original true gaze trajectories are incorrectly positioned as the uncalibrated gaze trajectories. There are many reasons behind why an eye tracking system without calibration is not accurate. Here, $g_{observation} = \Phi(\gamma, g_{true})$ can be used to denote the error model where $\gamma$ is a personalized parameter and $g_{true}$ is the true gaze trajectory. Both linear and non-linear errors in 2D over the screen may be considered. The error introduced by the angle kappa and error in eye pose estimation in the 3D world coordinate system may also be considered. Different types of uncalibrated errors may include translation and rotation errors, either in 2D or 3D. FIG. 4C illustrates two examples of a sample true gaze trajectory, while FIGS. 4D-G illustrate examples of uncalibrated gaze trajectories generated through different error models. Here, FIG. 4D illustrates two examples of a Constant2D error model, in which $\gamma$ is a constant 2D shift vector in the display coordinate system. $\Phi(\gamma, g_{true}) = g_{true} + [\gamma_x, \gamma_y]^T$. FIG. 4E illustrates two examples of a Poly2D error model, in which $\Phi(\gamma, g_{true})$ is a polynomial function of $g_{true}$, where $g_{true}$ is represented in the display coordinate system, e.g., as:

$$\Phi(\gamma, g_{true}) = \Sigma_{i=0}^{3} \Sigma_{j=0}^{3} [\gamma_{x\_i,j} x^i y^j, \gamma_{y\_i,j} x^i y^j]^T, g_{true} = [x, y]^T$$

FIG. 4F illustrates two examples of a Constant3D error model, in which $\Phi(\gamma, g_{true})$ is constant 3D angular shift over the gaze direction, modeled with R rotation matrix. For each user, R is constant. And FIG. 4G illustrates two examples of a HeadPose3D error model, in which $\Phi(\gamma, g_{true})$ accounts for a systematic error in estimated head pose, modeled with R rotation matrix and T translation in 3D. Here, both R and T may slightly depend on the eye position, and therefore change once the eye moves. Note that under each error model, $\gamma$ is consistent across all the page viewing data of the same user, thereby satisfying the nature of personalized calibration.

Figure 5A:
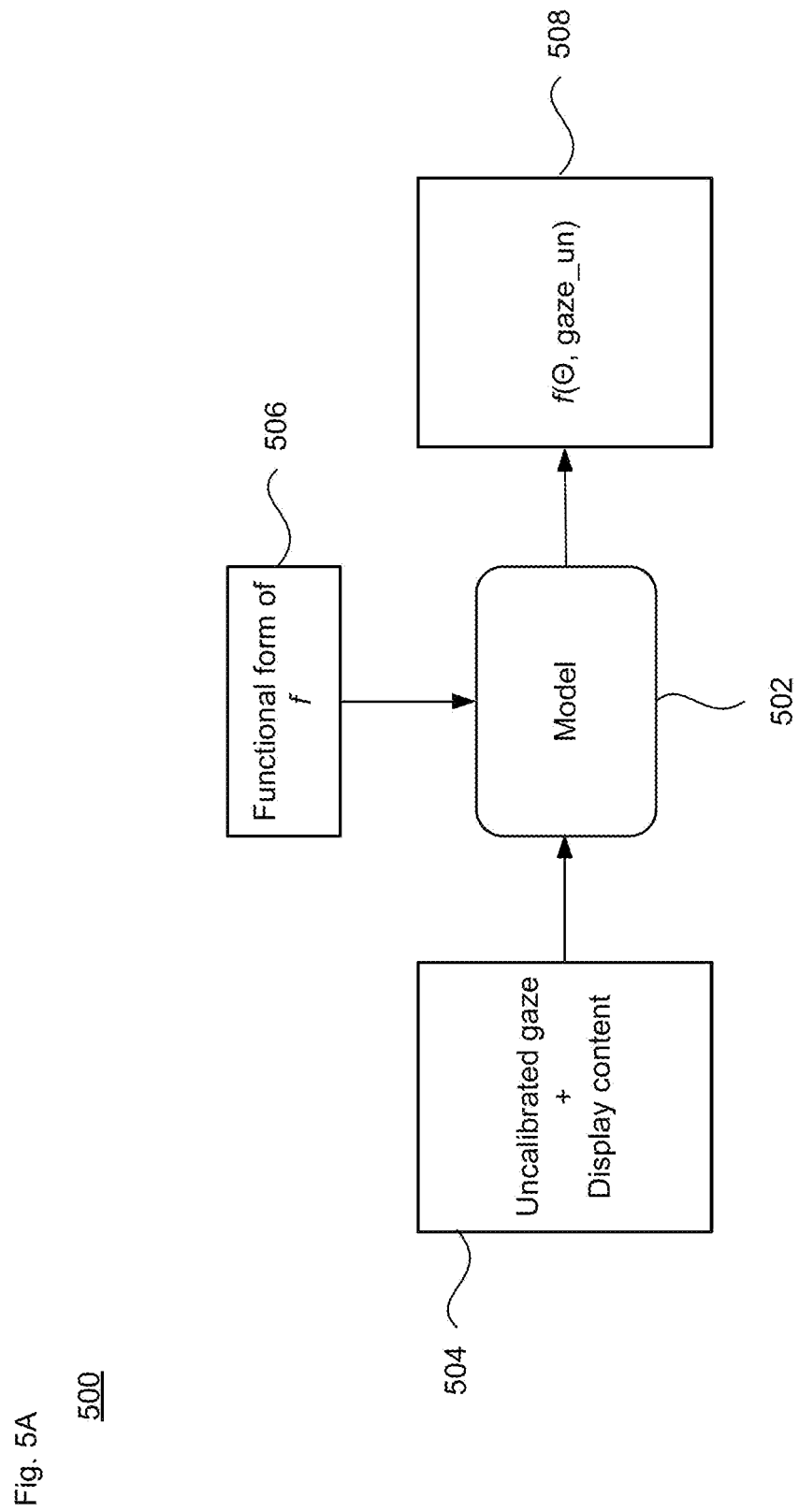
FIGS. 5A-B illustrate a generalized approach to implicit calibration in accordance with aspects of the technology.
Figure 5B:
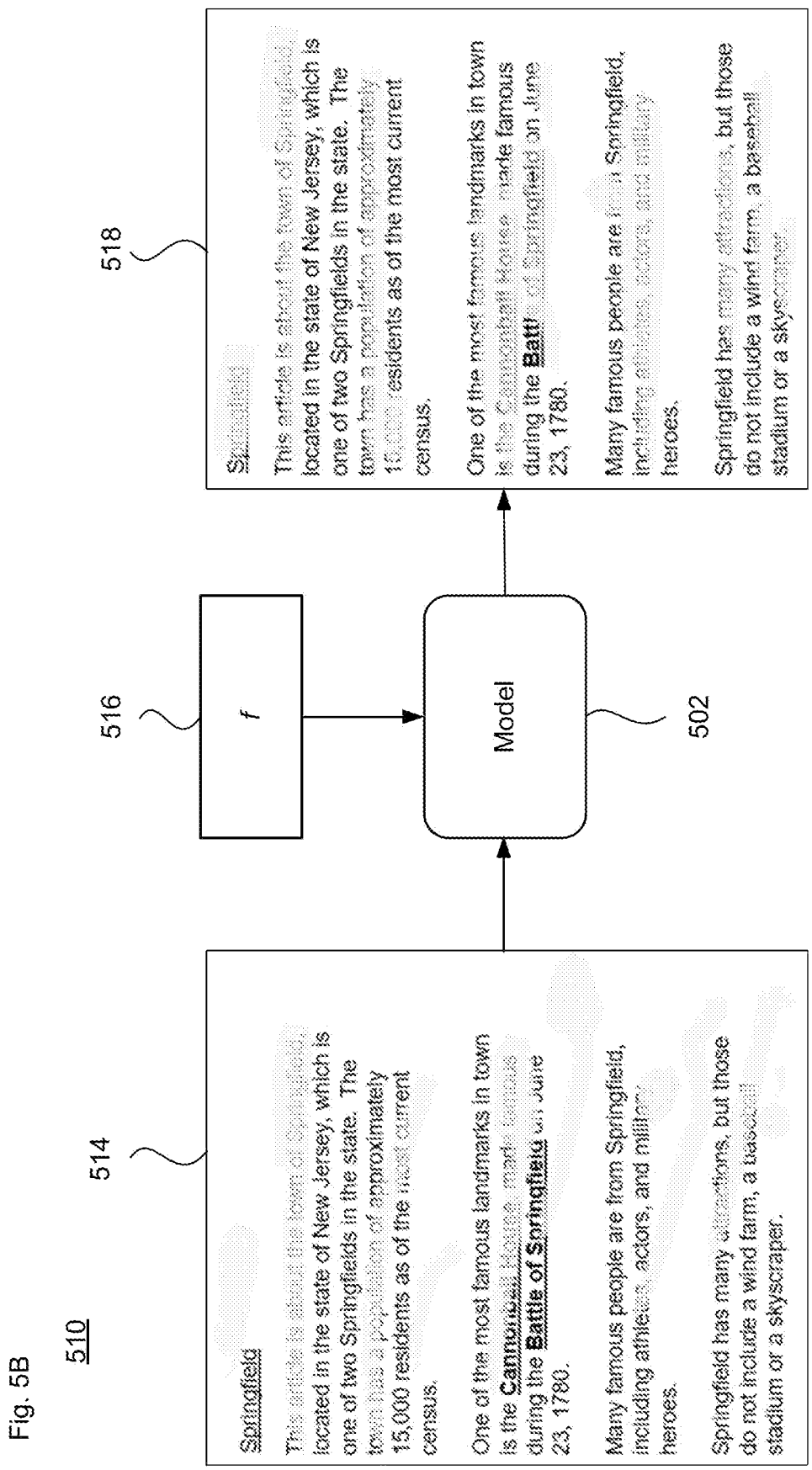

FIGS. 5A-B illustrate a generalized approach to implicit calibration. FIG. 5A is a block diagram 500. Here, model 502 (which can be implemented as a neural network module) receives inputs including uncalibrated gaze and display content (e.g., screen shot) data/information 504 showing the entire gaze trajectory for a selected timeframe, as well as a function 506 ($f$), which may be either a linear or polynomial function such as in the Poly2D example discussed above. In other words, the model can receive display content that is associated with content being presented on a display screen and uncalibrated gaze information. The uncalibrated gaze information can include an uncalibrated gaze trajectory that is associated with the gaze of a viewer when viewing the display content on the display screen. In some examples, the viewer's gaze is detected using one or more cameras associated with the display screen. The model 502 can apply the function 506 to the uncalibrated gaze and display content. The function which is selected for application (also called herein the selected function) can be selected based on one or more factors associated with the inputs to the model 502, or can be a predetermined selection. The output of the model, based on these inputs, is a user-specific (personalized) gaze function 508 ($f(\Theta, \text{gaze\_un})$). FIG. 5B is a functional view 510 showing how model 512 takes input display content (e.g., a screen shot or series of screen representations) and uncalibrated gaze information 514 and linear or polynomial function 516, and uses the user-specific gaze function to create a calibrated gaze for the input screen shot, as illustrated by block 518. As noted above, various perturbations in the screen display plane can be employed, such as Constant2D and/or Poly2D, and in the 3D space perturbations such as Constant3D and HeadPose3D may be employed. The uncalibrated gaze information or data at block 504 may include timestamp information for when the data (e.g., screen shot) was collected. Other information which is collected may include metadata such as screen orientation (e.g., landscape v. portrait), camera intrinsic characteristics (e.g., focal length, aspect ratio, total number of pixels/resolution, whether any filters have been applied), etc. The system may estimate personalized parameters ($\Theta$) from some or all of this collected data, or from any other data which is collected at the same time as the display content and the uncalibrated gaze trajectory. For instance, $\Theta$ can represent a calibration parameter, which may vary depending on the implementation. For instance, for linear calibration it could be just two parameters, e.g., {bias, weight}, while for non-linear, it could be a Kernel estimator or a Neural Network model. The calibration may be generally formulated as:

$$\Theta = \arg\min_\Theta \|F(\Theta, g_{observation}) - g_{true}\|^2$$

where $g_{observation}$ denotes the raw estimation of users' gaze without calibration while $g_{true}$ denotes the target gaze positions. Different calibration functional classes F may include: Linear-2D, which is a linear function and $g_{observation}$ and $g_{true}$ are represented in the display coordinate system (2D); SVR-2D, which is a nonlinear function and $g_{observation}$ and $g_{true}$ are represented in the display coordinate system (2D); Linear-3D, which is for a constant rotation over gaze direction and $g_{observation}$ and $g_{true}$ are the gaze vectors represented in the world coordinate system (3D); and EyePos-3D, which is an eye-position dependent rotation over gaze direction. Here, F is linear and $g_{observation}$ and $g_{true}$ include both gaze vector and eye position represented in the world coordinate system (3D). Alternatively or additionally, other calibration functions may be used (or selected). In some examples, the selection of the (calibration) function 506 to be applied by the model, such as whether the selected function is a linear or a polynomial function, may be a predetermined selection. In some examples, the function 506 to be applied by the model 502 may be selected at least in part based on the metadata, or collected data. The function 506 may additionally or alternatively be selected based on factors such as processing power of the device, the type of display content, or the like.

Synthetic Data

Figure 6C:
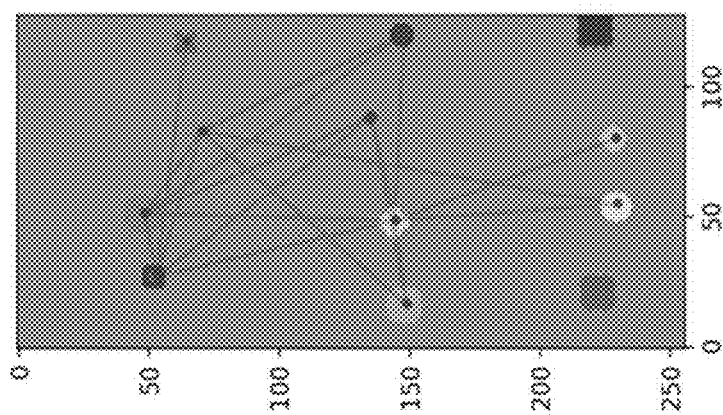
FIGS. 6A-C illustrate examples associated with synthetic screen content in accordance with aspects of the technology.
Figure 6B:
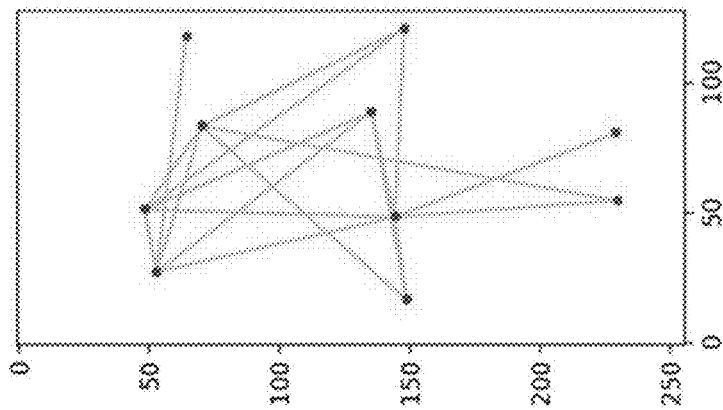
Figure 6A:
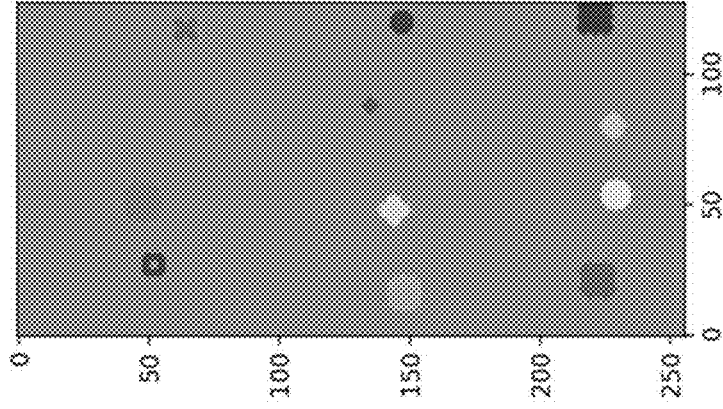

As noted above, the display content data may comprise actual content or synthetic content/data. This can include text and/or other graphical information (e.g., photographs, maps, line drawings, icons, etc.). FIGS. 6A-C illustrate an example 600 of synthetic screen content, an exemplary synthetic gaze trajectory 610, and a combination view 620 of synthetic screen content with gaze trajectory. In these examples, displacements in the U (lateral) and V (longitudinal) directions on the screen may be pixel displacements. The synthetic data may comprise a dataset of gaze trajectories for a group of users over some number of unique user interfaces (UIs). For instance, in one scenario, the synthetic dataset of gaze trajectories may be for 5,000-20,000 users captured over 20,000-40,000 unique UIs, which may be curated for training online calibration methods when users naturally browse apps or web pages. The synthetic imagery can provide a high degree of realism and perfect ground truth of gaze direction. User data in the dataset comprises a grouping of synthetically generated sequences of gaze fixations. In one example, each user observes a selected number of UI pages (e.g., 10-30 pages), which may be randomly sampled from the dataset.

FIGS. 6D-G illustrate examples of synthetic users viewing a mobile UI in accordance with aspects of the technology. The left image of each figure is a respective gaze trajectory of a synthetic user viewing the mobile UI. The right image of each figure is a corresponding heat map of gaze positions over the screen, where a normalized gaze density ranges from 0 to 1, with values at or close to 0 being dark blue, while values at or being close to 1 are red or brown, and values in between follow a color gradient between blue and red (e.g., green, yellow, orange, etc.). Heatmaps emphasize inherent inter-user variability in the UI viewing behavior, as opposed to saliency models that assume a common gaze pattern across users.

Figure 7A:
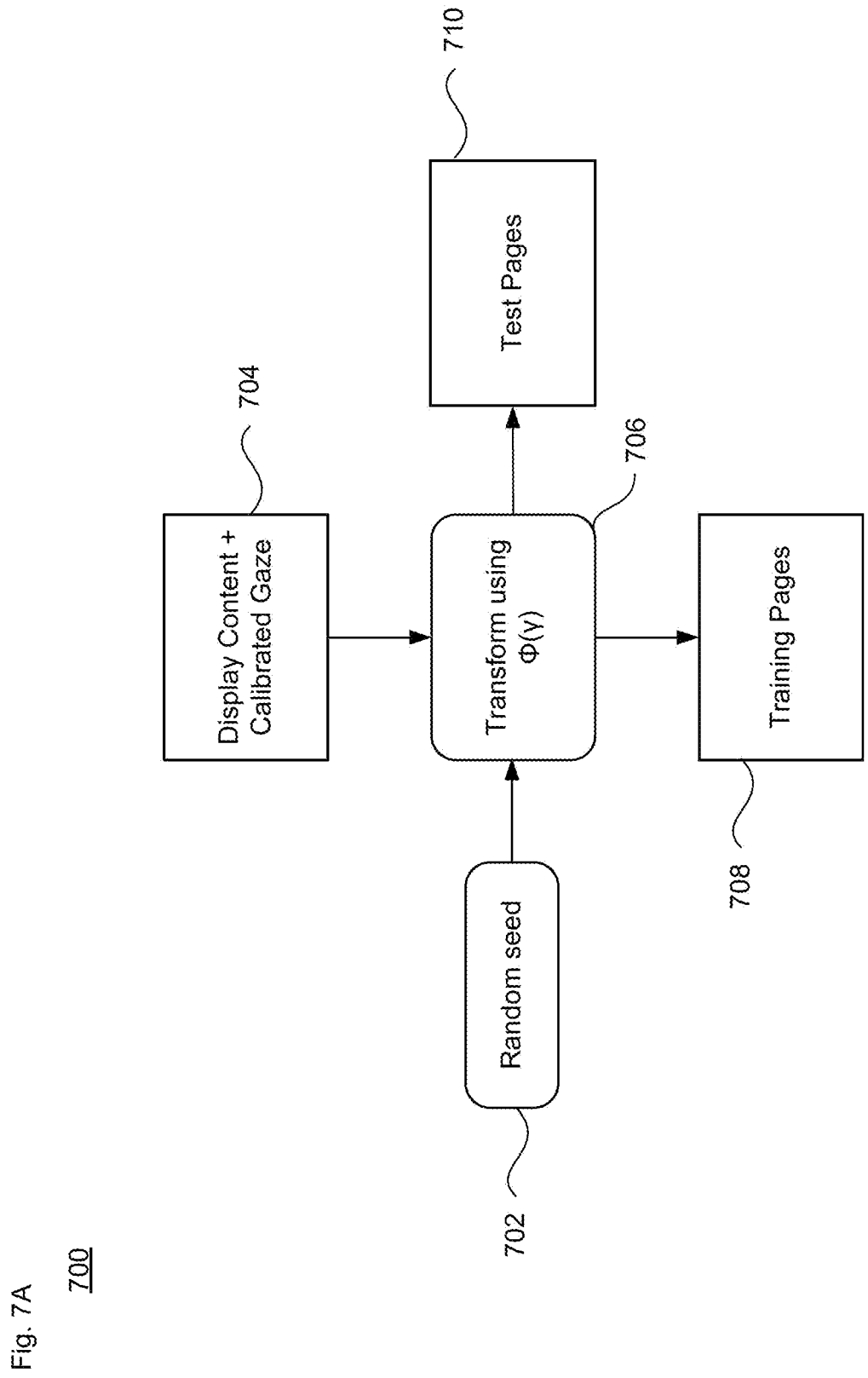
FIGS. 7A-B illustrate an example for generating training and test pages, and generating synthetic data, in accordance with aspects of the technology.

FIG. 7A illustrates a block diagram 700, which illustrates one approach to creating training pages and/or test pages using synthetic data using a variety of user specific parameters. The set of training pages and/or the set of test pages can each include (synthetic) screen/display data and (synthetic) uncalibrated gaze information corresponding to an uncalibrated user gaze when viewing the synthetic screen data. As shown, a random seed 702 and selected data 704 are input to a $\Phi(\gamma)$ transform. The random seed is used for pseudo-random number generation, in order to facilitate random generation of synthetic training and/or test pages. The selected data 704 includes screen data and calibrated gaze information. For instance, the screen data may include a stream of information including a timestamp, a screen image, user interaction information (e.g., a touch, click, scroll, etc.). The gaze information may include timestamps, a gaze vector (3D), eye position (3D), etc., which can be used to compute gaze location on the screen. The selected data may also include other information such as inertial measurement (IMU) data or other client device information. Based on these inputs, the $\Phi(\gamma)$ transform is performed at block 706. One output from the transform block 706 is a set of training pages 708. Another output is a set of test pages 710. Both the training pages 708 and test pages 710 may include screen data as well as uncalibrated and calibrated gaze information. The training and test pages may correspond to disjoint sets of visual stimuli (e.g., web pages), for instance for realistic evaluation of the process. These pages may share the same user parameters, but could be different visual stimuli. The training and test pages could be non-overlapping subsets from a common set of pages.

Figure 7B:
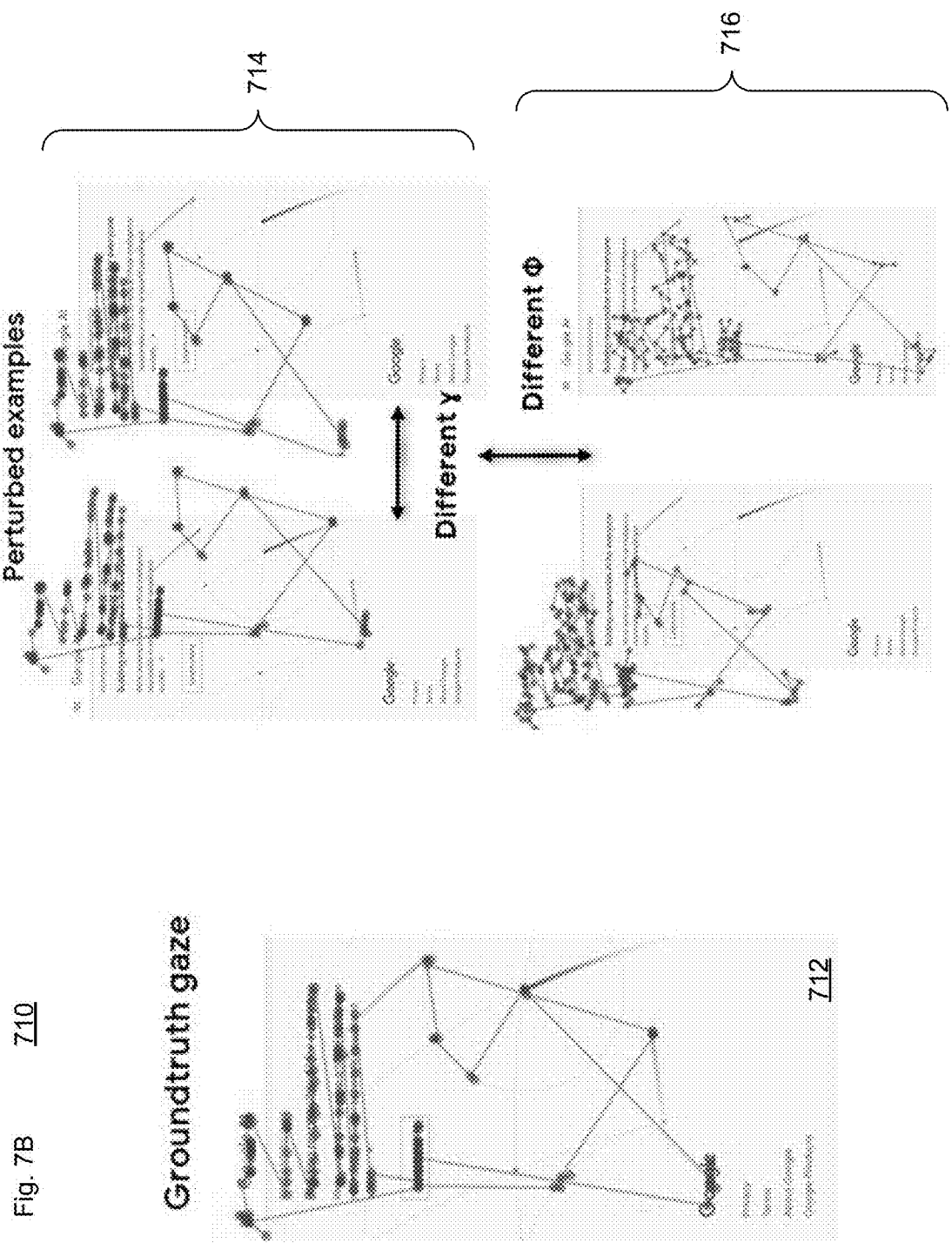

FIG. 7B illustrates a view 710 showing an example of synthetic data generation. Here, 712 indicates a ground truth gaze, area 714 indicates perturbed examples with different $\gamma$, and area 716 indicates perturbed examples with different $\Phi$. Here, note that the same person, for different page viewing, will share the same $\Phi$ and same $\gamma$ parameters. The model may be re-trained for each user. The different Φ correspond to different functional forms that operationalize the user-level parameters, γ, to model how uncalibrated gaze could look for different users. For a functional form of a rigid transformation, these parameters could represent a specific magnitude and direction of the translation or a specific rotation amount e.g., 5-10%. These specific parameters would be tied to a user, with each user having their own distinct values for translation and rotation.

Figure 8C:
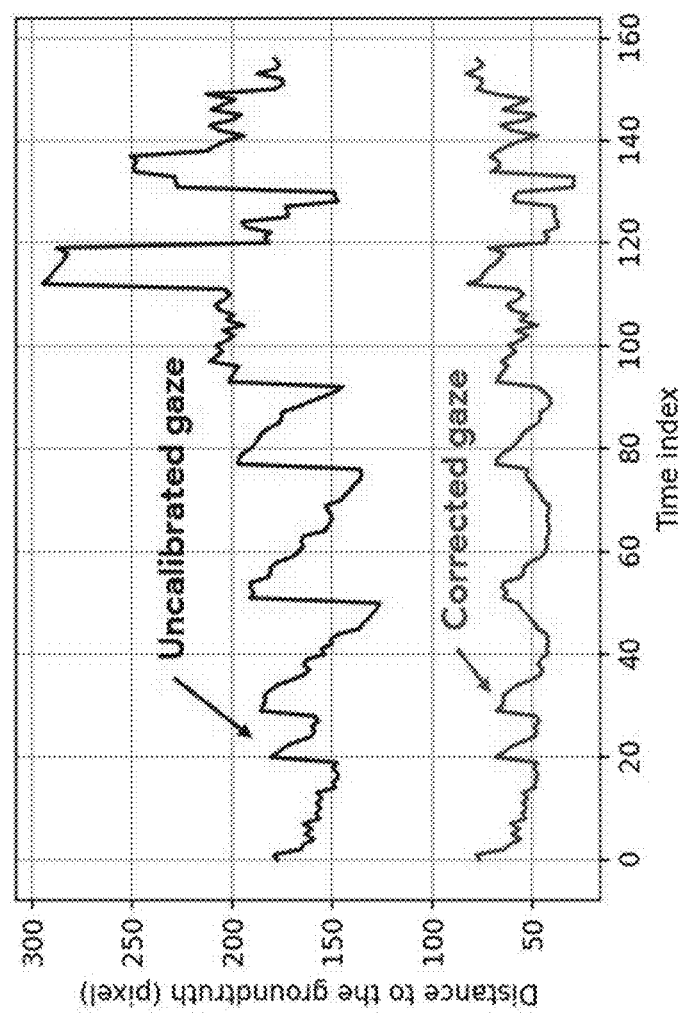
Figure 8B:
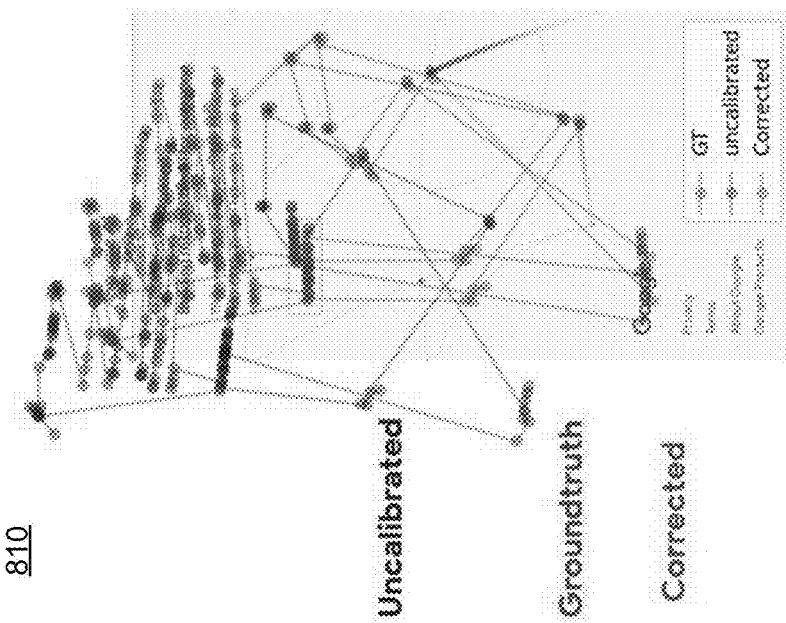

FIG. 8A illustrates an example scenario 800 using synthetic data. A synthetic gaze trajectory 802 is shown in the left view. An uncalibrated gaze trajectory 804, based on the synthetic display data presented on the display device, is shown in the middle view. And a corrected gaze trajectory 806 is shown in the right view, after application of the implicit gaze calibration model. FIG. 8B shows these trajectories overlaid on one another in view 810. FIG. 8C plots both the uncalibrated gaze and the corrected gaze graphically in chart 820. The chart has a vertical (y) axis showing the distance to the ground truth pixel for the uncalibrated and the corrected gazes, relative to a time index along horizontal (x) axis.

Machine Learning and Neural Networks for Implicit Gaze Correction

Figure 9A:
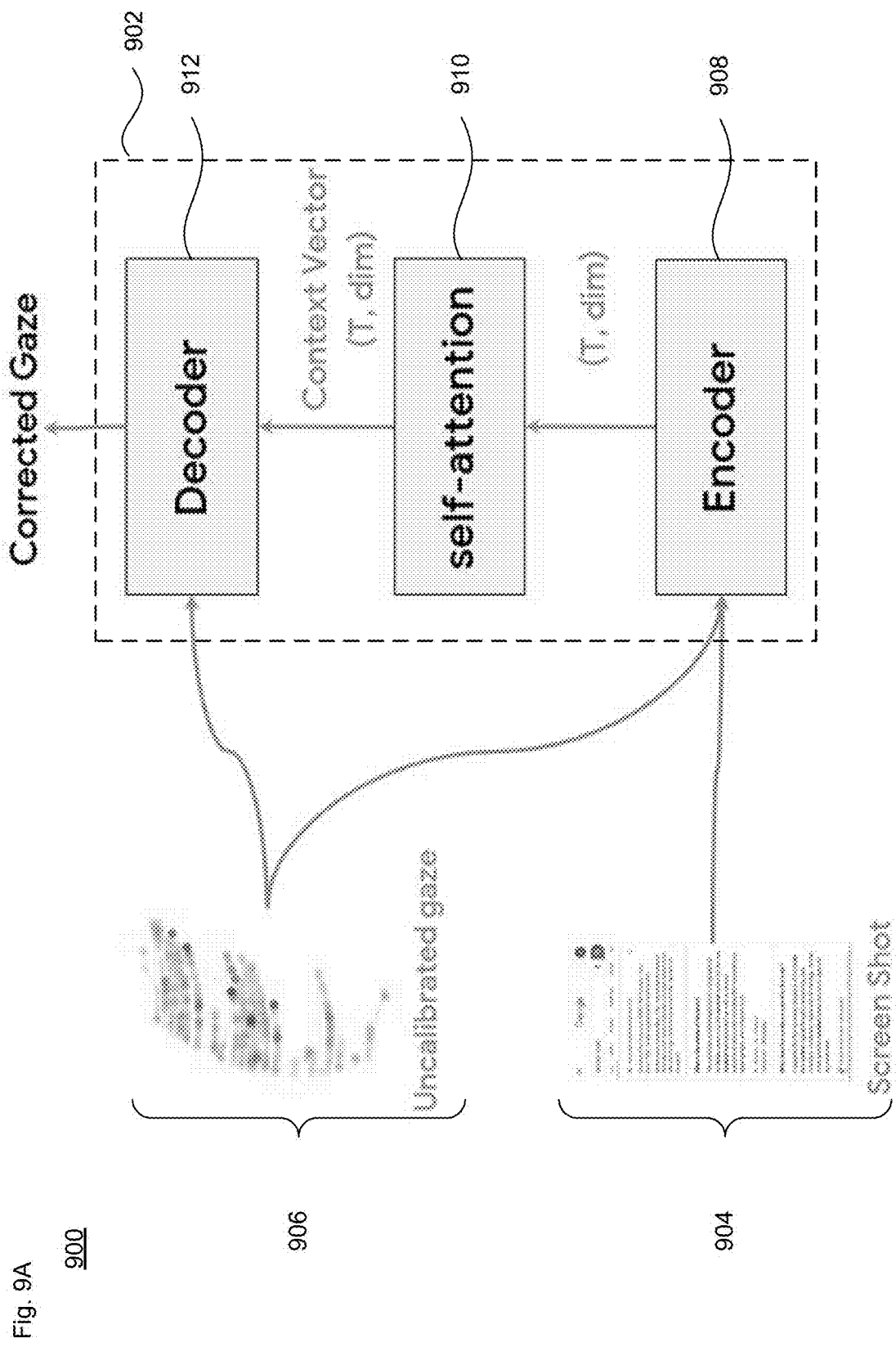
FIGS. 9A-D illustrate features of a neural network in accordance with aspects of the technology.

FIG. 9A illustrates one example 900 of a neural network module 902 for implicit gaze correction. As shown in this example, screen shot information 904 and uncalibrated gaze data 906 are input into an encoder block 908 of the neural network module, which generates temporal information (T) and dimensional information (dim) that is provided to a self-attention block 910. The dim represents dimensionality of the extracted feature. By way of example, dim may be set to any of the following: 32, 128, 256, or 1024.

The self-attention block uses the (T, dim) information to generate a context vector. An attention function can be described as mapping a query and a set of key-value pairs to an output, where the query, keys, values and outputs are all vectors. Self-attention, sometimes called intra-attention is an attention mechanism relating different positions of a single sequence in order to compute a representation of the sequence. The context vector for (T, dim) is used by decoder block 912 by applying it to the uncalibrated gaze information 906. The temporal information T represent the number of timestamps. It may encompass a time interval, e.g., 20-60 seconds, or more or less. Thus, in one example, for a 30 Hz camera, T=30 (Hz)*60 (seconds)*30=1800 gaze points. This operation results in the decoder block 912 generating a corrected gaze function that can be applied to calibrate gaze information (see, e.g., the examples in FIG. 4B, 518 in 5B and 806 in FIG. 8A). In the decode block 912, the context vector is multiplied with an array of data that is the uncalibrated gaze information. The temporal information may be encoded by looking through the entire sequence of gaze measurements and screen content pixels, with the same T.

Figure 9B:
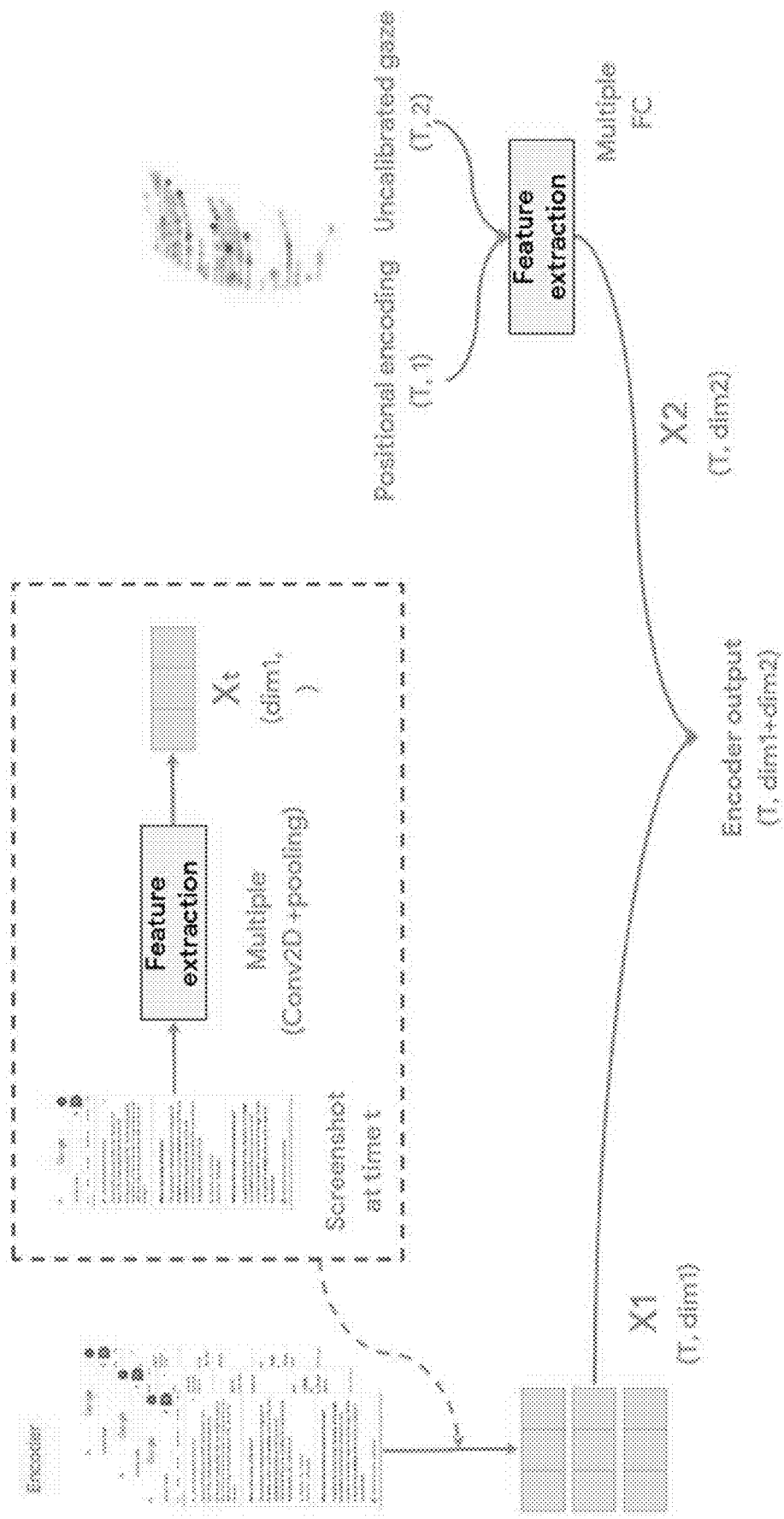

FIG. 9B illustrates a view 920 showing how the encoder may function, for instance as part of a CNN, DNN, SGNN, or QRNN. The neural network may include a set of fully connected layers. By way of example, there may be between 2-10 fully connected layers. As seen on the top left of view 920, the screen shot information may include a set of screen shots or other display content, with different screen shots taken at different points in time. The dotted box shows that features are extracted from the set of display content. This may be done with multiple convolutional layers using one or more Conv2D operations (or Conv2DTranspose operations), with or without and pooling. Dim 1 identifies the feature dimension of the encoder output, while dim2 identifies the feature dimension of the processed uncalibrated gaze input. This information is combined as shown to generate the encoder output (T, dim1+dim2).

Figure 9C:
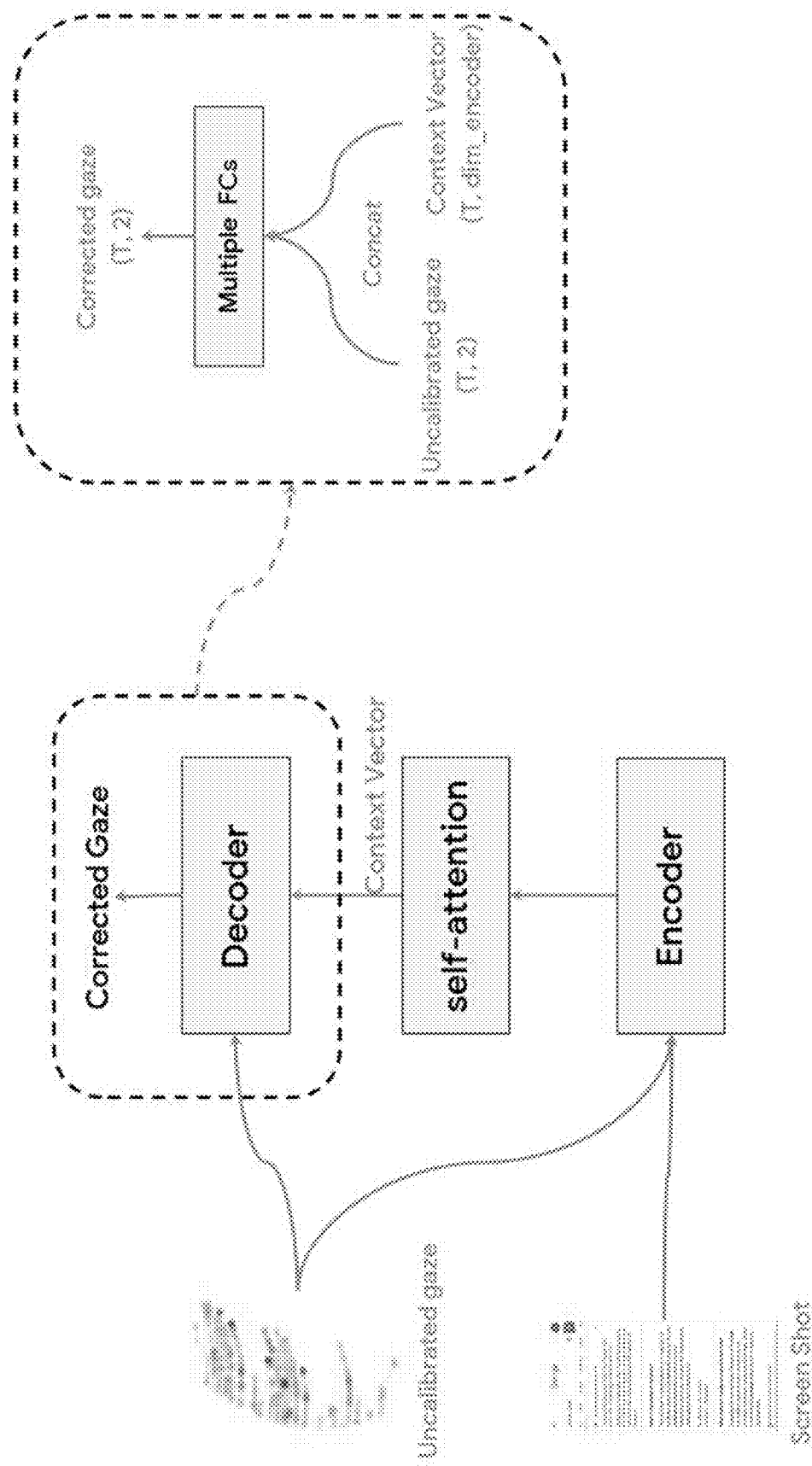

FIG. 9C is a view 940 that illustrates how the decoder may generate the corrected gaze using the encoded screen feature(s) (context vector) and the uncorrected gaze. Here, as shown in the block to the right, multiple fully connected layers of the neural network (Multiple FCs) receive the uncalibrated gaze information and the context vector, which has a feature dimension of the encoder output (dim_encoder). This information may be concatenated together or otherwise applied (e.g., multiplied) to obtain a corrected gaze function.

Figure 9D:
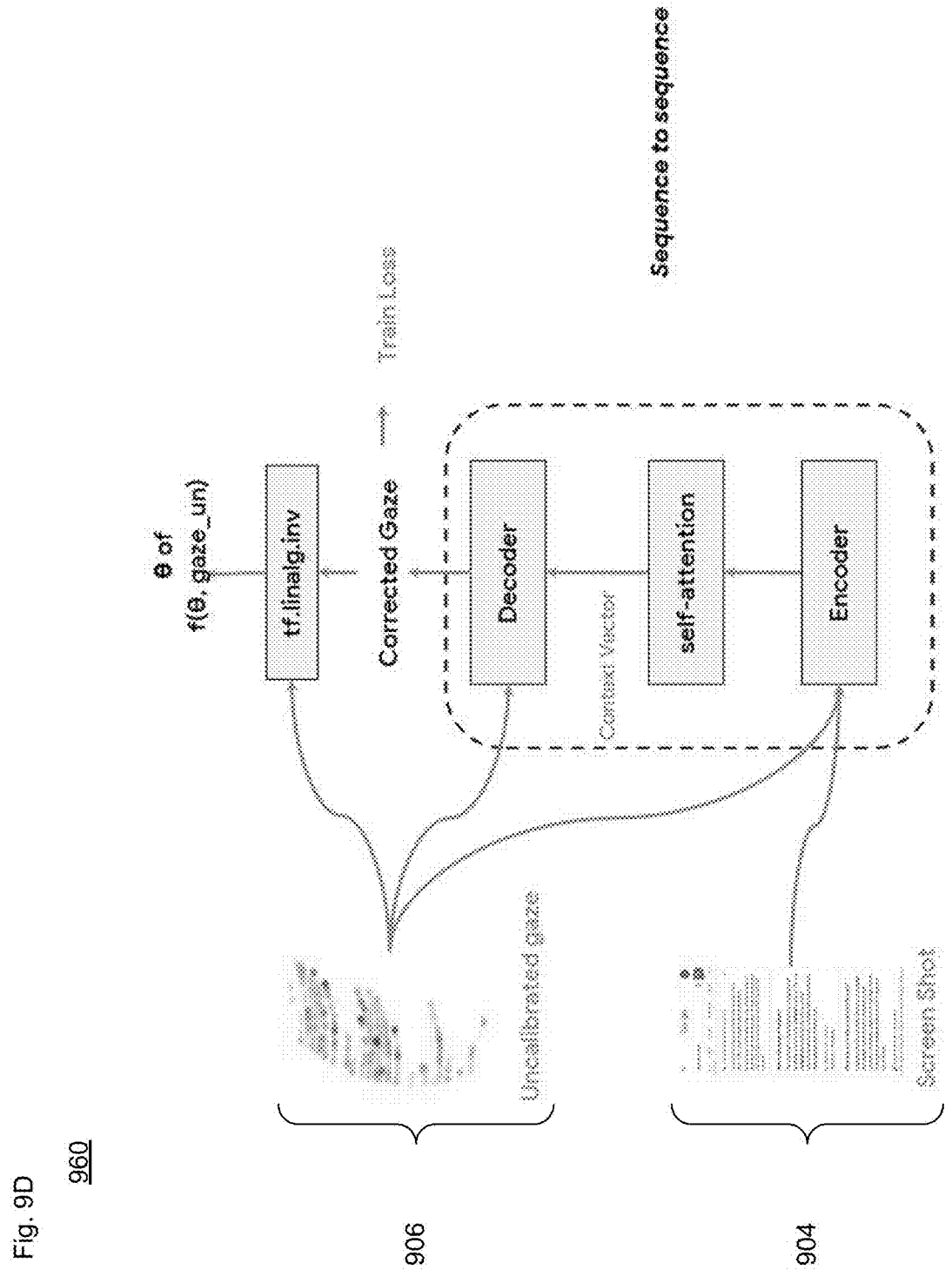

FIG. 9D illustrates a variation of the approach of FIG. 9A. In particular tf.linalg.inv corresponds to a matrix inversion operator, which is a one way to compute linear calibration parameters, based on uncorrected gaze and corrected gaze, e.g., by learning a linear/non-linear regression function: from $f_{uncorrected}$ to $f_{corrected}$.

Evaluation

Figure 10A:
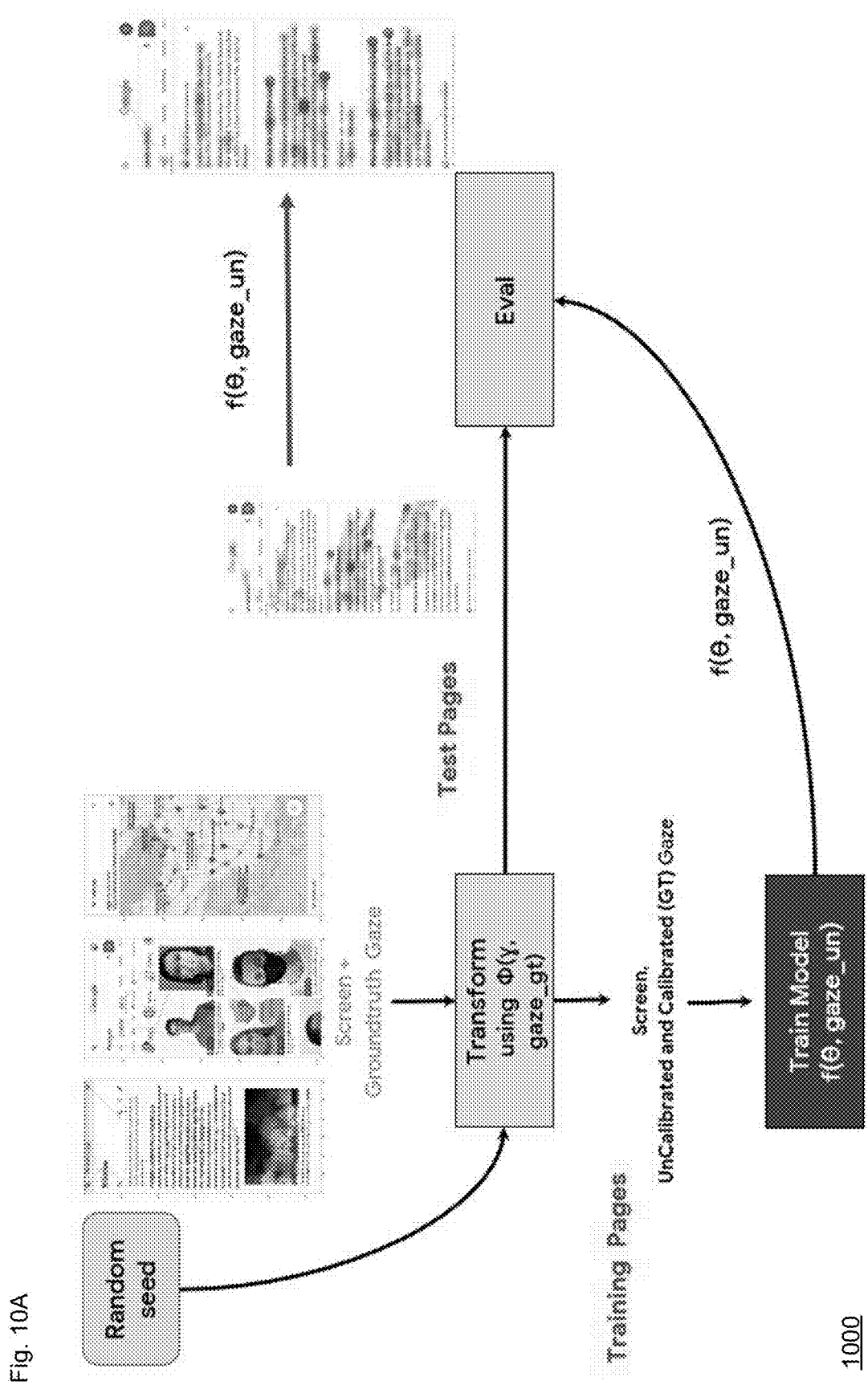
FIGS. 10A-B illustrate examples of training a model and evaluate the results of the model in accordance with aspects of the technology.
Figure 10B:
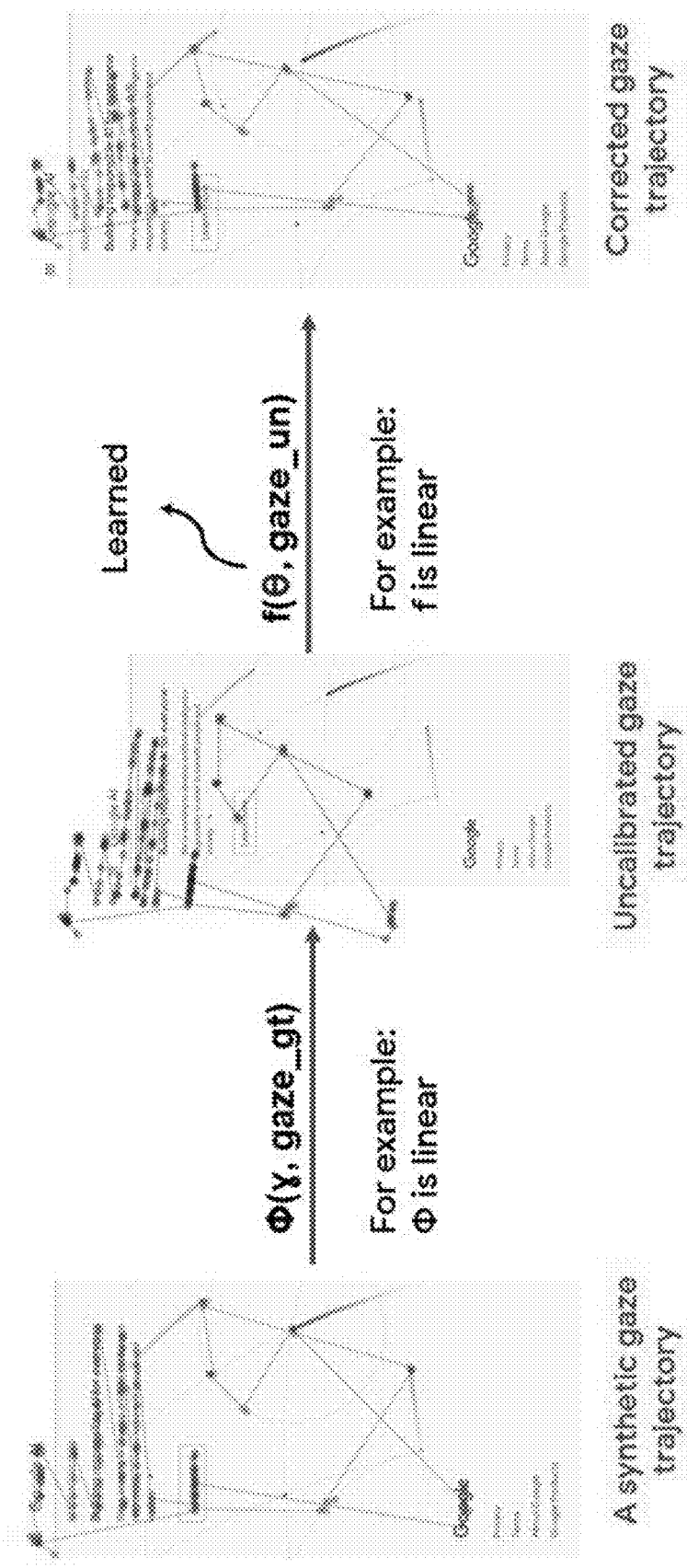

The sets of training pages and test pages may be used to train a model and evaluate the results of the model. FIG. 10A illustrates one example 1000 in which the random seed and screen information+ground truth gaze information ("gaze_gt") are applied to a transformation using Φ(γ, gaze_gt). The training pages associated with output from the transformation (displayable screen information, uncalibrated gaze information and calibrated ground truth gaze information are used as the inputs to train the model as discussed above. The corrected gaze function from the model, $f(\Theta, gaze\_un)$, is applied to one or more of the test pages for evaluation. FIG. 10B illustrates an example process 1020, which starts with a synthetic gaze trajectory, with Φ(γ, gaze_gt) being derived from this. In this example, Φ is linear. When Φ(γ, gaze_gt) is applied to the uncalibrated gaze trajectory, a learned function is obtained, $f(\Theta, gaze\_un)$. Similarly, in this example, $f$ is linear. Applying this function to the data results in a corrected gaze trajectory as shown in the right image of the figure. In other examples, Φ and/or $f$ may be nonlinear.

The above-described approach utilizes gaze-content correlation from an observation period when the user is looking at screen content to produce an adjustment (a calibration function) that does not require any side input (e.g., screen content, device specifications, etc.) at inference time. By not using side input, this approach provides simplicity and reduced latency of the gaze tracking system.

Prior to the observation period, the neural network can be pretrained. During the observation period, the system consumes a set of front-facing camera captures that are received from one or more imaging devices. This may comprise a time-series of image data, for which the calibration parameters are computed. Training may be performed offline (e.g., not during an observation period), using a set of uncalibrated gazes. This could be done one or more times for a given device (for a given user), for instance each time the device is turned on, when a particular app or other program is run, or at some other time. Training may also be performed for the given user depending on whether the user is wearing a pair of glasses or has taken them off, whether they are wearing contacts, or in other situations. The time horizon for observation may be, by way of example only, from about 10 seconds to several minutes (e.g., 2-5 minutes or more).

Various types of neural networks may be used to train the models discussed herein. These can include, by way of example only, Deep Neural Networks (DNNs) or Convolutional Neural Networks (CNNs). By way of example, different models may be trained for textual content, photographs, maps or other types of imagery, or on specific types of content. The models may be trained offline, for instance using a back-end remote computing system (see FIGS. 9A-B) or trained by the (on-device) computing system of a user device. Once trained, the models may be used by client devices or back-end systems to perform implicit calibration on displayed content.

Figure 11A:
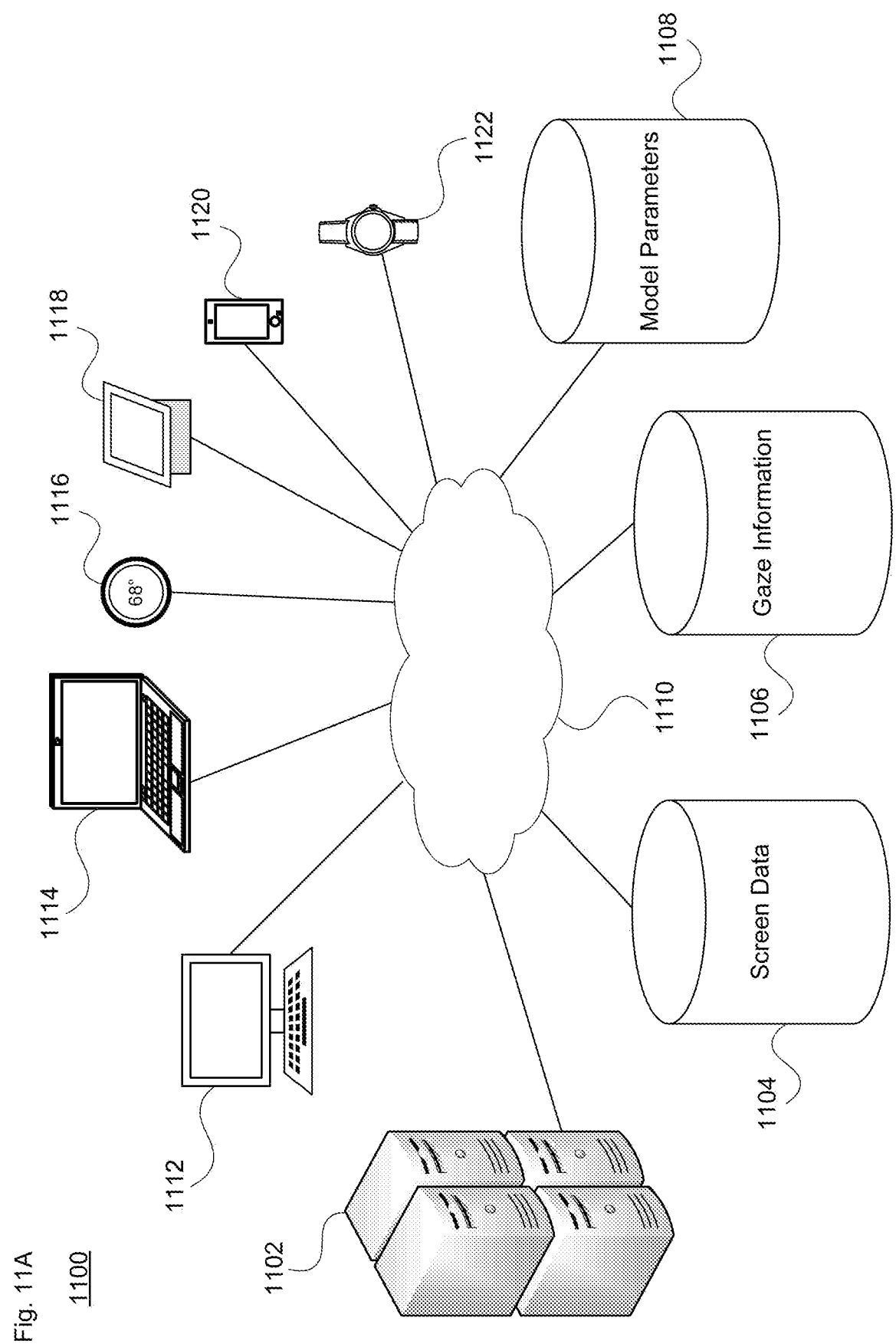
FIGS. 11A-B illustrate a system for use with aspects of the technology.
Figure 11B:
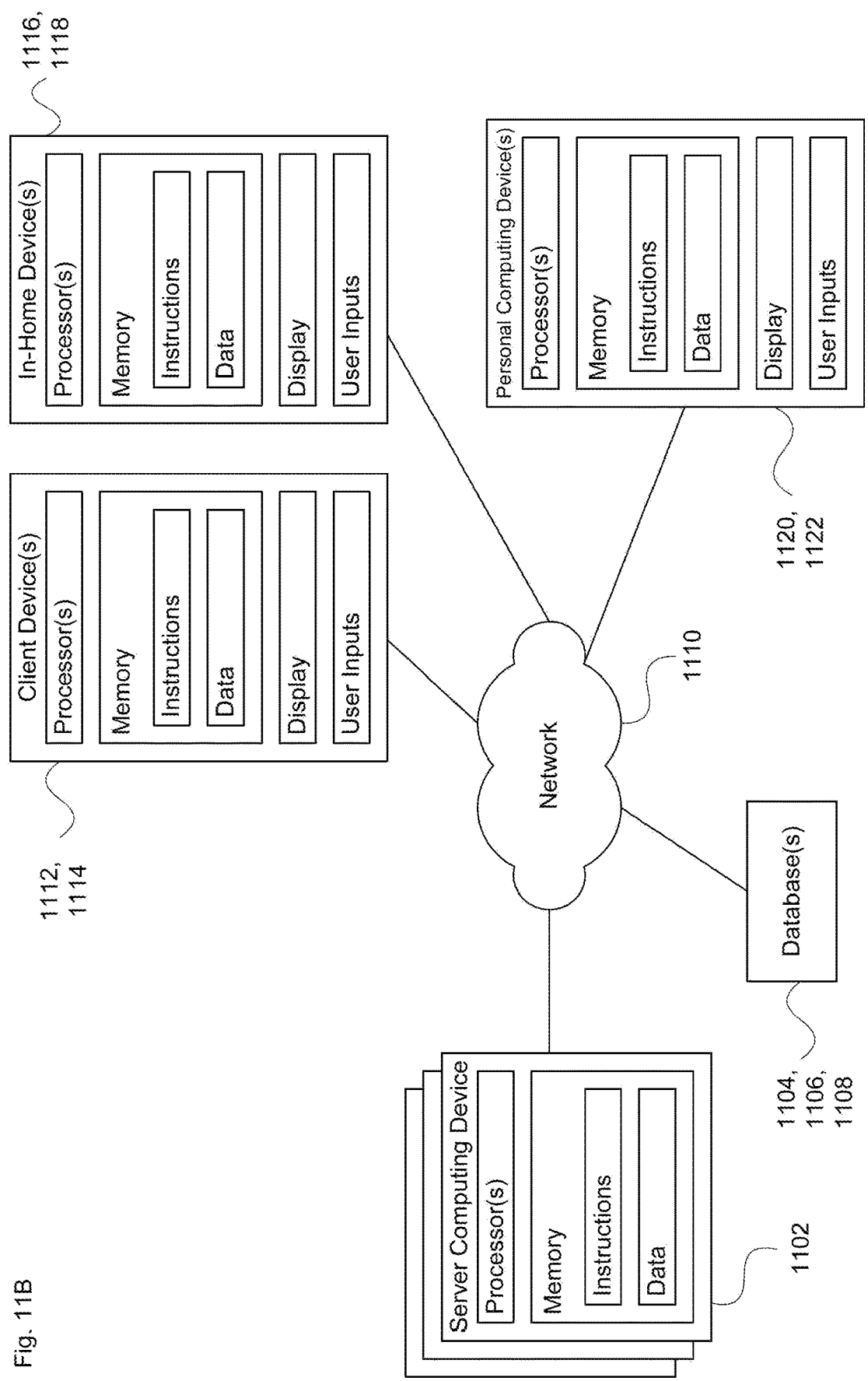

One example computing architecture is shown in FIGS. 11A and 11B. In particular, FIGS. 11A and 11B are pictorial and functional diagrams, respectively, of an example system 1000 that includes a plurality of computing devices and databases connected via a network. For instance, computing device(s) 1102 may be a cloud-based server system. Databases 1104, 1106 and 1108 may store screen data, gaze information and/or model parameters, respectively. The server system may access the databases via network 1110. Client devices may include one or more of a desktop computer 1112, a laptop or tablet PC 1114, in-home devices that may be fixed (such as a temperature/thermostat unit 1116) or moveable units (such as smart display 1118). Other client devices may include a personal communication device such as a mobile phone or PDA 1120, or a wearable device 1122 such as a smart watch, head-mounted display, clothing wearable, etc.

Users may employ any of devices 1112-1122 (or other systems such as a wheelchair) by operating a user interface with their gaze as the primary or sole control signal. Other applications include VR environments (e.g., interactive gaming, immersive tours, or the like), concussion diagnosis and monitoring driver (in) attention in a manual or partly autonomous driving mode of a vehicle such as a passenger car, a bus or a cargo truck.

As shown in FIG. 11B, each of the computing devices 1102 and 1112-1122 may include one or more processors, memory, data and instructions. The memory stores information accessible by the one or more processors, including instructions and data (e.g., models) that may be executed or otherwise used by the processor(s). The memory may be of any type capable of storing information accessible by the processor(s), including a computing device-readable medium. The memory is a non-transitory medium such as a hard-drive, memory card, optical disk, solid-state, etc. Systems may include different combinations of the foregoing, whereby different portions of the instructions and data are stored on different types of media. The instructions may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance.

The processors may be any conventional processors, such as commercially available CPUs. Alternatively, each processor may be a dedicated device such as an ASIC or other hardware-based processor. Although FIG. 11B functionally illustrates the processors, memory, and other elements of a given computing device as being within the same block, such devices may actually include multiple processors, computing devices, or memories that may or may not be stored within the same physical housing. Similarly, the memory may be a hard drive or other storage media located in a housing different from that of the processor(s), for instance in a cloud computing system of server 1102. Accordingly, references to a processor or computing device will be understood to include references to a collection of processors or computing devices or memories that may or may not operate in parallel.

The input data, such as a random seed, screen data and calibrated gaze information, may be used in a transform process to generate one or more sets of training pages and/or test pages. These pages may be used to train a calibration model and to evaluate operation of the model. In addition, model parameters may also be used when training the model. Screen shots and uncalibrated gaze information may be applied to the model to obtain a personalized function.

The computing devices may include all of the components normally used in connection with a computing device such as the processor and memory described above as well as a user interface subsystem for receiving input from a user and presenting information to the user (e.g., text, imagery and/or other graphical elements). The user interface subsystem may include one or more user inputs (e.g., at least one front (user) facing camera, a mouse, keyboard, touch screen and/or microphone) and one or more display devices (e.g., a monitor having a screen or any other electrical device that is operable to display information (e.g., text, imagery and/or other graphical elements). Other output devices, such as speaker(s) may also provide information to users.

The user-related computing devices (e.g., 1112-1122) may communicate with a back-end computing system (e.g., server 1102) via one or more networks, such as network 1110. The network 1110, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 1102 may include one or more server computing devices having a plurality of computing devices, e.g., a load balanced server farm or cloud computing system, that exchange information with different nodes of a network for the purpose of receiving, processing and transmitting the data to and from other computing devices. For instance, computing device 1102 may include one or more server computing devices that are capable of communicating with any of the computing devices 1112-1122 via the network 1110.

Calibration information derived from the model, the model itself, sets of training pages and/or test pages, or the like may be shared by the server with one or more of the client computing devices. Alternatively or additionally, the client device(s) may maintain their own databases, models and other implicit calibration information.

FIG. 12 illustrates a method 1200 in accordance with aspects of the technology, which involves performing implicit gaze calibration for gaze tracking. At block 1202, the method includes receiving, by a neural network module, display content that is associated with presentation on a display screen; the display content may be associated with content which is currently being (or has previously been) presented on a display screen, such as a screen shot or other representation of the displayed content, or may be otherwise associated with the presentation of content on a display screen. At block 1204, the neural network module also receives uncalibrated gaze information. The uncalibrated gaze information includes an uncalibrated gaze trajectory that is associated with a viewer gaze of the display content on the display screen (for example, is associated with the gaze of a viewer when viewing the display content on the display screen). In some examples, the viewer's gaze is detected using one or more cameras associated with the display screen. At block 1206, the neural network module applies a selected function to the uncalibrated gaze information and the display content to generate a user-specific gaze function, in which the user-specific gaze function has one or more personalized parameters. The function can be selected based on one or more factors associated with the display content and/or the uncalibrated gaze information, or can be a predetermined selection. And at block 1208, the neural network module applies the user-specific gaze function to the uncalibrated gaze information to generate calibrated gaze information associated with the display content on the display screen.

Figure 13:
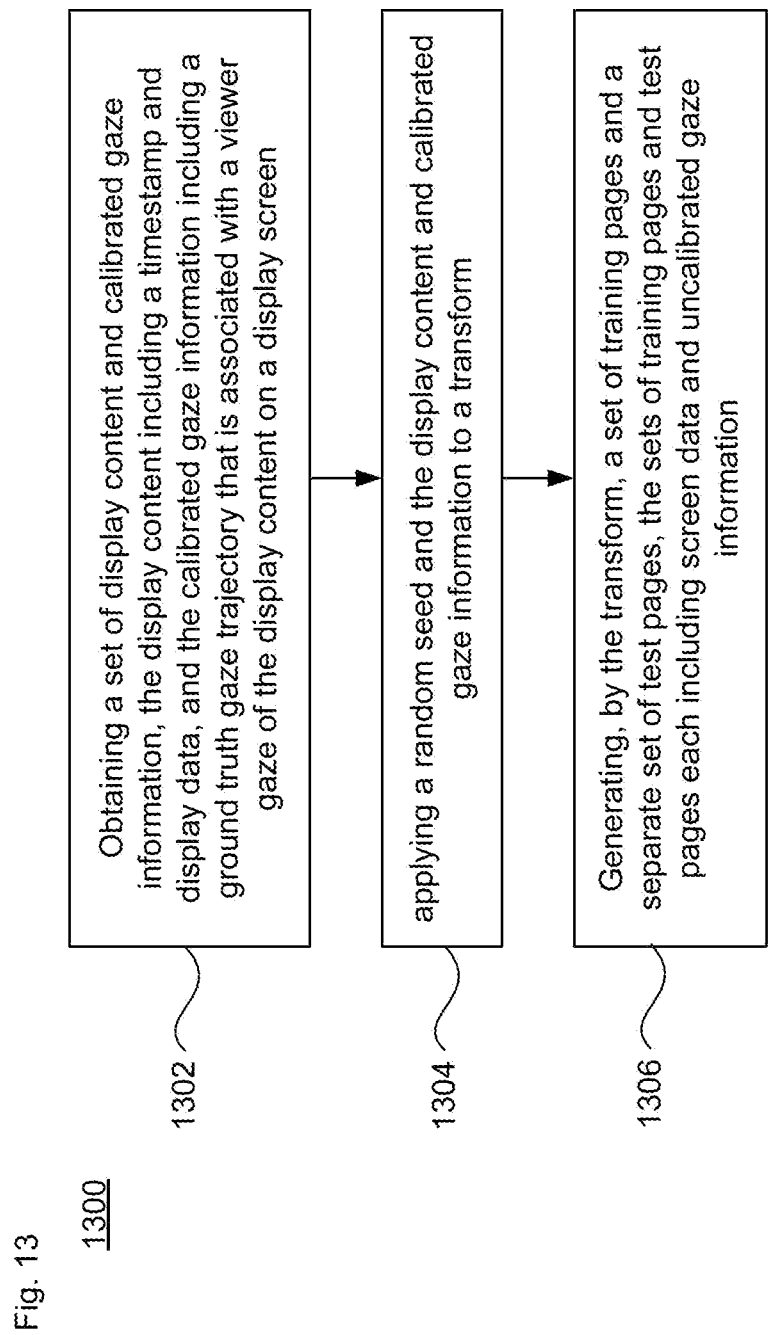
FIG. 13 illustrates another method in accordance with aspects of the technology.

FIG. 13 illustrates another method 1300 in accordance with aspects of the technology, which includes creating training and testing information for implicit gaze calibration. At block 1302, the method includes obtaining a set of display content and calibrated gaze information, in which the display content includes a timestamp and display data, and the calibrated gaze information includes a ground truth gaze trajectory that is associated with a viewer gaze of the display content on a display screen. At block 1304, the method includes applying a random seed and the display content and calibrated gaze information to a transform. And at block 1306, the transform generates a set of (synthetic) training pages and a separate set of (synthetic) test pages. The sets of training pages and test pages each include screen data and uncalibrated gaze information (i.e. the calibrated gaze information is transformed to create synthetic, uncalibrated, gaze information for training and testing purposes).

The training, testing and implicit gaze calibration approaches discussed herein are advantageous for a number of reasons. There is no need to require multiple training sessions for a given user. The calibration can be done in real time with a wide variety of display devices that are suitable for many different applications, such as navigating a wheelchair with the user's gaze as the primary or only control signal, aiding medical diagnostics, enriching VR applications, improving web page browsing and application operation, and many others.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

By way of example, while aspects of the technology are based on text input, the technology is applicable in many other computing contexts other than text-centric applications. One such situation includes adaptively customizing/changing the graphical user interface based on detected emotions. For instance, in a customer support platform/app, the color of the UI presented to the customer support agent could change (e.g., to red or amber) when it is perceived that customers are beginning to get frustrated or angry. Also, some applications and services may employ a "stateful" view of users when providing general action suggestions and in surfacing information that is more tailored to the context of a specific user. In a query-based system for a web browser, an emotion classification signal may be fed into the ranking system to help select/suggest web links that are more relevant in view of the emotional state of the user. As another example, emotion classification can also be used in an assistance-focused app to suggest actions for the user to take (such as navigating to a place that the user often visits when in a celebratory mood, suggesting scheduling an appointment with the user's therapist, etc.).

The invention claimed is:

1. A computer-implemented method of performing implicit gaze calibration for gaze tracking, the method comprising:
   receiving, by a neural network module, display content that is associated with presentation on a display screen;
   receiving, by the neural network module, uncalibrated gaze information, the uncalibrated gaze information including an uncalibrated gaze trajectory that is associated with a viewer gaze of the display content on the display screen;
   applying, by the neural network module, a selected function to the uncalibrated gaze information and the display content to generate a user-specific gaze function, the user-specific gaze function having one or more personalized parameters; and
   applying, by the neural network module, the user-specific gaze function to the uncalibrated gaze information to generate calibrated gaze information associated with the display content on the display screen.

2. The method of claim 1, wherein the selected function is a linear or polynomial function.

3. The method of claim 1, wherein the uncalibrated gaze information further includes timestamp information for when the display content was collected.

4. The method of claim 1, wherein the uncalibrated gaze information further includes at least one of screen orientation information, camera focal length, aspect ratio, or resolution information.

5. The method of claim 1, wherein the one or more personalized parameters of the user-specific gaze function are estimated from collected data.

6. The method of claim 1, wherein applying the selected function to the uncalibrated gaze information and the display content to generate a user-specific gaze function includes:
   generating temporal information and dimensional information at an encoder block of the neural network;
   generating a context vector from the temporal information and the dimensional information in a self-attention block of the neural network; and
   applying the context vector to the uncalibrated gaze information to generate the calibrated gaze information, in a decoder block of the neural network.

7. The method of claim 6, wherein the temporal information encompasses a selected time interval associated with a gaze along the display screen.

8. The method of claim 7, wherein the temporal information is encoded by looking through an entire sequence of gaze measurements and screen content pixels associated with the entire sequence.

9. The method of claim 6, wherein applying the context vector to the uncalibrated gaze information comprises multiplying the context vector with an array of data from the uncalibrated gaze information.

10. The method of claim 6, wherein applying the context vector to the uncalibrated gaze information includes applying the uncalibrated gaze information and the context vector using a plurality of fully connected layers of the neural network.

11. The method of claim 1, wherein the display content comprises synthetic content.

12. The method of claim 11, wherein the synthetic content includes at least one of synthetic text or synthetic graphical information.

13. The method of claim 11, wherein the synthetic content corresponds to a dataset of gaze trajectories for a group of users over a selected number of unique user interfaces.

14. The system of claim 1, wherein application of the selected function to the uncalibrated gaze information and the display content to generate a user-specific gaze function includes:
generation of temporal information and dimensional information at an encoder block of the neural network;
generation of a context vector from the temporal information and the dimensional information in a self-attention block of the neural network; and
application of the context vector to the uncalibrated gaze information to generate the calibrated gaze information, in a decoder block of the neural network.

15. A system comprising one or more processors and one or more storage devices storing instructions, wherein when the instructions are executed by the one or more processors, the one or more processors implement a method of implicit gaze calibration for gaze tracking comprising:
receiving, by a neural network module of the one or more processors, display content that is associated with presentation on a display screen;
receiving, by the neural network module, uncalibrated gaze information, the uncalibrated gaze information including an uncalibrated gaze trajectory that is associated with a viewer gaze of the display content on the display screen;
applying, by the neural network module, a selected function to the uncalibrated gaze information and the display content to generate a user-specific gaze function, the user-specific gaze function having one or more personalized parameters; and
applying, by the neural network module, the user-specific gaze function to the uncalibrated gaze information to generate calibrated gaze information associated with the display content on the display screen.

16. The system of claim 15, wherein the uncalibrated gaze information further includes timestamp information for when the display content was collected.

17. The system of claim 15, wherein the uncalibrated gaze information further includes at least one of screen orientation information, camera focal length, aspect ratio, or resolution information.

18. The system of claim 15, wherein the one or more personalized parameters of the user-specific gaze function are estimated from collected data.

19. The system of claim 15, wherein the display content comprises synthetic content.

20. The system of claim 15, wherein the synthetic content either includes at least one of synthetic text or synthetic graphical information, or corresponds to a dataset of gaze trajectories for a group of users over a selected number of unique user interfaces.

* * * * *